US007721304B2

(12) United States Patent
Datla et al.

(10) Patent No.: US 7,721,304 B2
(45) Date of Patent: May 18, 2010

(54) METHOD AND APPARATUS PROVIDING PROGRAMMABLE NETWORK INTELLIGENCE

(75) Inventors: Krishnam Raju Datla, Union City, CA (US); Srinivasa Beereddy, Fremont, CA (US); Praveen Vengalam, Mountain View, CA (US); Chandrasekhar Guntakala, Sunnyvale, CA (US); Chandrareddy Manubothu, Santa Clara, CA (US); Parthasarathy Venkatavaradhan, Cupertino, CA (US); Muni Thunuguntlu, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 1147 days.

(21) Appl. No.: 11/148,725

(22) Filed: Jun. 8, 2005

(65) Prior Publication Data

US 2006/0013217 A1    Jan. 19, 2006

Related U.S. Application Data

(63) Continuation-in-part of application No. 11/012,885, filed on Dec. 14, 2004.

(60) Provisional application No. 60/521,633, filed on Jun. 8, 2004.

(51) Int. Cl.
*G06F 9/44*    (2006.01)
*G06F 15/18*   (2006.01)
*G06F 15/177*  (2006.01)

(52) U.S. Cl. ............................ 719/328; 706/21; 709/220

(58) Field of Classification Search ......... 709/201–207, 709/217–225; 710/8–10; 719/318, 328, 719/330; 706/21; 717/104
See application file for complete search history.

(56) References Cited

U.S. PATENT DOCUMENTS

| 4,617,643 | A  |   | 10/1986 | Klock et al. |
| 4,686,623 | A  |   | 8/1987  | Wallace |
| 4,972,264 | A  |   | 11/1990 | Bishop et al. |
| 6,243,862 | B1 |   | 6/2001  | Lebow |
| 6,421,719 | B1 | * | 7/2002  | Lewis et al. ................ 709/224 |
| 6,502,112 | B1 |   | 12/2002 | Baisley |
| 6,523,172 | B1 |   | 2/2003  | Martinez-Guerra et al. |
| 6,597,666 | B1 |   | 7/2003  | Hemzal et al. |
| 6,601,059 | B1 |   | 7/2003  | Fries |
| 6,615,257 | B2 |   | 9/2003  | Lee et al. |
| 6,920,458 | B1 | * | 7/2005  | Chu et al. ................... 707/102 |
| 6,954,925 | B1 |   | 10/2005 | Kong |
| 6,959,329 | B2 |   | 10/2005 | Thakor |
| 7,032,014 | B2 | * | 4/2006  | Thiyagarajan et al. ...... 709/220 |
| 7,113,989 | B2 | * | 9/2006  | Murray et al. .............. 709/224 |
| 7,216,298 | B1 |   | 5/2007  | Ballard et al. |

(Continued)

OTHER PUBLICATIONS

Enns, Ed R., "NETCONF Configuration Protocol", Copyright The Internet Society 2006, Juniper Networks, Network Working Group, Internet-Draft, Feb. 2006, 94 pages.

(Continued)

*Primary Examiner*—Li B Zhen
*Assistant Examiner*—Charles E Anya
(74) *Attorney, Agent, or Firm*—Hickman Palermo Truong & Becker LLP

(57) ABSTRACT

Programmable network intelligence approaches as disclosed herein provide apparatus, methods and tools to achieve programmable interfaces to a device, or group of devices or a network where native programmable interfaces are not available.

33 Claims, 27 Drawing Sheets

U.S. PATENT DOCUMENTS

| | | | |
|---|---|---|---|
| 7,284,009 B2 * | 10/2007 | Perrow | 707/102 |
| 7,287,069 B1 | 10/2007 | Kavasseri et al. | |
| 7,376,719 B1 | 5/2008 | Shafer et al. | |
| 7,376,969 B1 | 5/2008 | Njemanze et al. | |
| 7,418,733 B2 | 8/2008 | Connary et al. | |
| 2003/0115305 A1 * | 6/2003 | Murray et al. | 709/222 |
| 2003/0131077 A1 | 7/2003 | Hogan | |
| 2003/0140132 A1 | 7/2003 | Champagne et al. | |
| 2003/0226131 A1 | 12/2003 | Li | |
| 2004/0030771 A1 * | 2/2004 | Strassner | 709/224 |
| 2004/0040016 A1 | 2/2004 | Pearce et al. | |
| 2004/0111499 A1 * | 6/2004 | Dobrowski et al. | 709/222 |
| 2004/0117624 A1 | 6/2004 | Brandt et al. | |
| 2004/0153536 A1 * | 8/2004 | Strassner | 709/223 |
| 2004/0205737 A1 | 10/2004 | Margaliot et al. | |
| 2004/0210654 A1 | 10/2004 | Hrastar | |
| 2005/0004942 A1 | 1/2005 | Madsen et al. | |
| 2005/0015624 A1 | 1/2005 | Ginter et al. | |
| 2005/0021684 A1 | 1/2005 | Hsue et al. | |
| 2005/0108387 A1 * | 5/2005 | Li et al. | 709/224 |
| 2005/0114479 A1 | 5/2005 | Watson-Luke | |
| 2005/0182969 A1 | 8/2005 | Ginter et al. | |
| 2005/0262225 A1 | 11/2005 | Halpern et al. | |
| 2006/0004680 A1 | 1/2006 | Robarts et al. | |
| 2007/0180432 A1 | 8/2007 | Gassner et al. | |

OTHER PUBLICATIONS

CISCO, "Using the Cisco IOS Command Line Interface", Oct. 2, 1998, Chapter 3, 8 pages.

* cited by examiner

```xml
<?xml version='1.0' ?>
<CliParserData>
  <ViewList>
    <View name='test-view' prompt='test-view' level='0' parent='exec'>
      <Keyword id='root' hint='TopLevel' descr='TopLevel'>
        <!-- Start of test commands -->

<Keyword id='test' hint='test' descr='command syntax tester'>
          <Month id='month' hint='MONTH' descr='name of the month'>
            <Callback/>
          </Month>

<Time id='time' hint='hh:mm:ss' descr='time of the day'>
            <Callback/>
          </Time>
        </Keyword>

<!-- END of test commands -->
      </Keyword>
    </View>
  </ViewList>
</CliParserData>
```

*Fig. 19*

METHOD AND APPARATUS PROVIDING PROGRAMMABLE NETWORK INTELLIGENCE

PRIORITY CLAIM; CROSS-REFERENCE TO RELATED APPLICATIONS

This application claims benefit of Provisional Appln. 60/521,633, filed Jun. 8, 2004, the entire contents of which is hereby incorporated by reference as if fully set forth herein, under 35 U.S.C. §119(e).

This application claims domestic priority under 35 U.S.C. §120 as a Continuation-in-part of U.S. application Ser. No. 11/012,885, filed Dec. 14, 2004, the entire contents of which is hereby incorporated by reference as if fully set forth herein.

This application is related to U.S. application Ser. No. 11,148,709, filed Jun. 8, 2005, of Krishnam Raju Datla et al., entitled "Apparatus and Method for Intelligent Configuration Editor," U.S. application Ser. No. 11,148,709 (now U.S. Pat. No. 7,499,902), filed Jun. 8, 2005, of Krishnam Raju Datla et al., entitled "Method and Apparatus for Data Model Prediction," U.S. application Ser. No. 11,148,489, filed Jun. 8, 2005, of Krishnam Raju Datla et al., entitled "Method and Apparatus Providing Unified Compliant Network Audit," and U.S. application Ser. No. 11,148,708, filed Jun. 8, 2005, of Krishnam Raju Datla et al., entitled "Configuration Syntax and Semantic Validation."

FIELD OF THE INVENTION

The present invention generally relates to network management. The invention relates more specifically to approaches for providing a management interface to a network device that does not have a native management interface.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

A typical computer network consists of various devices such as routers, switches, wireless access points, firewalls, etc. FIG. 16 illustrates an example network that includes such elements.

A typical network device provides a command interface that is accessible using the telnet protocol, a secure shell (SSH) connection, or serial port interface to create, update, retrieve and store management information relating to the device. A network management station (NMS) can deliver commands through such an interface to provide a higher level or enhanced management capability to the network operator or administrator.

To interoperate with a network device, the NMS must have knowledge of what commands the device supports, so that the NMS can deliver commands that are compatible with the device's command interface and that produce desired results. One way to provide such knowledge to an NMS is by adding command definitions to the NMS manually, either through a programmatic approach by updating the computer program code that forms the NMS, or by changing a separate device data table that is used by the NMS. However, this approach is slow and error-prone, especially when the NMS supports a large number of different devices.

Further, whenever a change occurs in the set of commands that a particular device type supports, a change is required to the NMS. Thus, this approach requires ongoing software development efforts to keep the NMS compatible with the commands that devices recognize or support.

Therefore, there is a need for a better way to provide knowledge about commands that a network device supports.

A typical network device, such as a router or a switch as used in packet-switched networks, provides a command line interface (CLI) that is accessible through Telnet, Secure Shell (SSH) and serial port interface for changing the device status or configuration. Each configuration command for the device has an associated syntax. A Network Management Station (NMS) can use the configuration commands to provide a higher level or enhanced management capability to the network operator. The NMS requires knowledge of the device configuration commands and the syntax of the commands to perform changing the configuration of a device.

One disadvantage with a CLI is that it is suitable for a human operator, but not for programs that can configure and control the device. A programmable API is required for such tasks. The devices can be built with programmable APIs, but providing a programmable interface on already existing systems and devices can be very expensive, if not impractical. It would be beneficial to have an automated approach for generating a programmable interface for an existing device or for devices that are already deployed at operating sites.

The NETCONF network device configuration protocol under development by the Internet Engineering Task Force (IETF) provides mechanisms to install, manipulate, and delete the configuration of network devices. It uses an Extensible Markup Language (XML) based data encoding for the configuration data as well as the protocol messages. The NETCONF protocol operations are realized on top of a Remote Procedure Call (RPC) layer. NETCONF is an emerging standard, and many network devices do not presently support it. Further, many network devices cannot directly execute commands that are delivered in XML, and many network management applications cannot interoperate with XML documents that conform to NETCONF.

Certain past approaches have attempted to implement a configuration interface layer on top of the CLI supported by Cisco IOS Software from Cisco Systems, Inc. These approaches have supported a narrow range of device types and configuration. These implementations also have required manual coding of the CLI rules, and since the data model is custom, have also required manual coding of processes for transformation of the model to the CLI and CLI to the model.

BRIEF DESCRIPTION OF THE DRAWINGS

The present invention is illustrated by way of example, and not by way of limitation, in the figures of the accompanying drawings and in which like reference numerals refer to similar elements and in which:

FIG. 19 is an example command knowledge base in XML format.

DETAILED DESCRIPTION

Figure 1A:
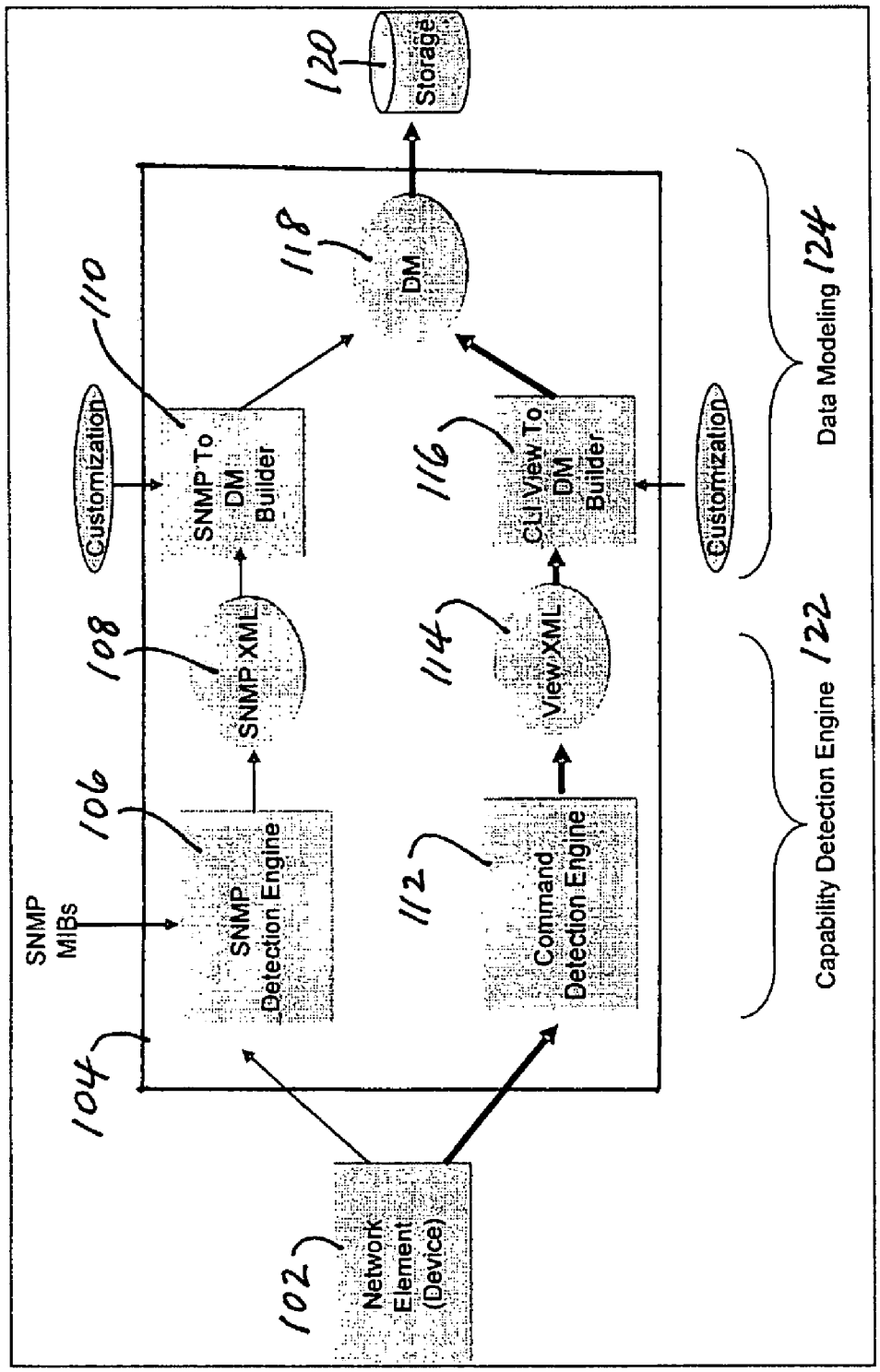
FIG. 1A is a block diagram that illustrates an overview of a Data Model Prediction engine and its components.

A method and apparatus providing programmable network intelligence is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Method and Apparatus for Data Model Prediction
   3.1 EDI Runtime System
   3.2 CLI View Data Structure
   3.3 Intermediate Model Data Structure
   3.4 Building An Intermediate Data Model Based On A Command Line Interface Data Model
   3.5 Transformation From CLI To XML Format
   3.6 Transformation Error Handling
   3.7 Example Interface Design
4.0 Creating a Command Knowledge Base
   4.1 Structural Overview
   4.2 Functional Overview
   4.3 Context Processing
   4.4 Syntax Knowledge Example
5.0 Programmable Network Intelligence
6.0 Implementation Mechanisms-Hardware Overview
7.0 Extensions and Alternatives The following acronyms have the following definitions throughout this document:
   CLI: Command Line Interface
   C2X: CLI to XML
   E-DI: Enhanced Device Interface
   IDM: Intermediate Data Model
   IDM View: The IDM graph data structure
   CLI View: The CLI parser graph data structure
   PCA: Parse Chain Analyzer
   X2C: XML to CLI
   kw: Keyword
   non-kw: Non-keyword
   minOcc: Minimum occurrences
   cr: Carriage return position for command
   negCr: Carriage return position for negation command

1.0 General Overview

The needs identified in the foregoing Background, and other needs and objects that will become apparent for the following description, are achieved in the present invention, which comprises, in one aspect, a method comprising the machine-implemented steps of receiving one or more command line interface commands associated with a network device that does not natively provide a programmable management interface; creating and storing a knowledge base comprising a representation of a syntax and semantics of the commands; receiving from the knowledge base a data structure representing a particular configuration command among the commands; creating and storing an intermediate data model that represents the configuration command, wherein creating the intermediate data model includes predicting one or more attributes of the configuration command; based on the intermediate data model, creating and storing a file defining an application programming interface for the network device.

According to a feature, the application programming interface is generated at least in part based upon a capability matrix containing information about capabilities of the network device. According to another feature, the predicting is performed at least in part based upon device capabilities that are derived from the capability matrix. According to still another feature, an application request is received at the application programming interface, and in response thereto, the intermediate data model is selectively transformed into a text representation of the particular configuration command or into a structured document representation of the particular configuration command.

In another feature, the knowledge base is created and stored in an automatic command learning process based on receiving and interpreting a plurality of the commands as the commands are provided to the network device.

In yet another feature, the predicting includes predicting one or more names of one or more parameters to the particular configuration command. According to various other features, the predicting includes predicting whether a particular parameter is mandatory or optional to complete the particular command, predicting data types of the parameters, predicting a cardinality attribute of the particular configuration command, and predicting an order of the parameters.

According to another feature, the intermediate data model represents a command using one or more container objects and one or more properties objects. In yet another feature, the knowledge base is created based on receiving information from one or more CLI management information bases (MIBs) and one or more SNMP MIBs supported on the device. In still a further feature, selectively transforming includes selectively transforming the intermediate data model into an extensible markup language (XML) representation of the particular configuration command. The XML representation may conform to NETCONF protocol and may be transformed in response to receiving one or more NETCONF XML requests.

In other aspects, the invention encompasses a computer apparatus and a computer-readable medium configured to carry out the foregoing steps.

2.0 Structural and Functional Overview

The apparatus and methods specified in this disclosure will achieve programmable interfaces using a capability detection engine to detect the capability of the devices, a predicted data model which accurately model the data structures required to achieve command and configuration operations, a validation engine to verify the validity of the predicted data model, and a run time environment which provides the programmable interfaces.

According to one embodiment, the approach described herein can build a data model that accurately represents the command line interface that is supported by one or more network devices. The data model predicts the data structures required to generate the device native commands. The data model can be used to generate programmable interfaces, which can be used by other programs or network management systems to configure and control the devices.

A Data Model Prediction approach disclosed herein attempts tries to derive the data structures required to represent native commands supported on a particular device. Generally, device commands follow certain syntax and semantics, and may take one or more parameters. Each parameter may have an associated type and constraints. Some parameters may be mandatory and others are optional. The syntax for a particular device may require parameters to appear in a particular sequence. A command can have a single instance or multiple instances.

In one embodiment, automated logic builds a knowledge base that represents the commands and the syntax for each command supported by a device under one or more command views. In an embodiment, a Capability Detection engine builds the knowledge base. The knowledge base may comprise information stored in a database either in the form of binary data, text, or a set of structured electronic documents, e.g., XML documents. The Data Model Prediction approach herein uses the command knowledge base to build an accurate data model.

According to an embodiment, the Data Model Prediction approach herein predicts the data structures and parameters in the data structures with the following aspects: Cardinality, which specifies if the number of instances allowed; whether a parameter is mandatory or optional; data type of parameters such as integer, Boolean, string, etc.; and order of the parameters present in the structure such as sequence, choice and all.

In one embodiment, predicted data structures are represented in the form of Containers and Properties. A Container can contain other Containers and Properties. A Property represents a leaf item in the hierarchy and may represent a specific parameter in the command.

In an embodiment, a command and its associated keywords and parameters are represented in a hierarchical structure of Containers and Properties. If a command has one keyword followed by a parameter, which defines the value for the keyword, then the command is represented by a property. As an example of a Data Model for a simple command, the command "hostname sj-rtr1" may be represented in XML format as: <Property Name='Hostname' Type='String' MinOcc='1' Annotation='hostname string'>

If a command has a keyword and followed by multiple parameters, then the command is represented by a Container which may contain other Containers and Properties. As an example of a Data Model for such a more complex command, the command "ip address ip_address mask [secondary]" may be represented as shown in Table 1:

TABLE 1

XML REPRESENTATION OF COMPLEX COMMAND

<Container Name='IPAddress' MinOcc='1' Order='jahi-idm:sequence' Annotation='IP address'>
    <Property Name='IPAddressValue' Type='IPAddress' MinOcc='1' Annotation='IP address'>
    </Property>
    <Property Name='IPSubnetMask' Type='IPAddress' MinOcc='1' Annotation='IP subnet mask'>
    </Property>
    <Property Name='Secondary' Type='Boolean' MinOcc='0' Annotation='Make this IP address a secondary address'>
    </Property>
</Container>

An embodiment determines a command name. Each container and property is identified with a name. The name is derived from the name of the parameter. Some parameters may not have associated name. In that case, a name is derived from the description of the parameter using natural language processing.

An embodiment determines whether a command parameter is mandatory or optional. Whether a parameter is mandatory or optional is predicted by analyzing the command and its parameters. If the command can be completed without a particular parameter, then the parameter is optional. If the command cannot be completed with a specific parameter, then that parameter is mandatory. If a parameter is optional, all the subsequent parameters may not be optional, and may be dependent on the predecessor parameters. All parameters are analyzed completely to determine if a parameter is mandatory or optional.

An embodiment determines the cardinality of a command. A command can have one or more instances. If a command has cardinality of 1, that is, a single instance, then issuing multiple such commands causes a device to overwrite previous commands and apply only the most recently ones. If a command has cardinality of more than 1, then issuing multiple such commands causes a device to create and apply multiple instances in the device configuration.

In one embodiment, the cardinality of a command is predicted using the negation version of that particular command. For example, assume a command has the form 'hostname name' and sets the name of the device in question. If the syntax of the negation command is 'no hostname' or 'no hostname [name]', which indicates that the 'name' is an optional parameter, then the 'hostname' command has cardinality of 1. If the negation command syntax is 'no hostname name', which indicates 'name' is a mandatory parameter that must be specified to negate the command, then the hostname command has cardinality of more than 1.

An embodiment determines the required order of parameters. A command can accept a parameter from a set of multiple parameters. In that case the data structure must specify the order as choice for the possible parameters. If the command has parameters that follow one another in a strict order, then the sequence must be used.

A parameter may have a data type for values it can accept, such as Integer, String, Boolean, IP address, etc. According to an embodiment, the data type for the values of parameters is predicted. If a parameter accepts only digits, then the type may be integer; if a parameter accepts characters as valid input, then the type is String; if the parameter expects a numeric string with subfields delimited using periods, then the type is IP address.

FIG. 1A is a block diagram that illustrates an overview of a Data Model Prediction engine and its components. A network element or network device 102 is coupled to a data model generating system 104 that comprises a capability detection engine 122 and a data modeling subsystem 124. Capability detection engine 122 comprises an SNMP detection engine 106 and SNMP to data model (DM) builder 110. Data modeling subsystem 124 comprises a command detection engine 112 and CLI view to DM builder 116. System 104 also is coupled to data storage 120.

In an alternative embodiment, system 104 is disconnected from the network device 102 and receives CLI commands from a configuration file, network management system, application, or user input terminal.

SNMP detection engine 106 and command detection engine 112 receive copies of commands that a user or application issues to network device 102. SNMP detection engine 106 detects commands that are issued using or conform to Simple Network Management Protocol (SNMP), and creates a structured representation of the commands in one or more SNMP XML documents 108. SNMP to DM builder 110 receives the SNMP XML documents and forms at least a part of data model 118 based on them.

Command detection engine 112 detects commands that are conform to a general execution or configuration command syntax for network device 102 and creates a structured representation of the commands in one or more command view XML documents 114. CLI view to DM builder 116 receives the XML documents and forms at least a part of data model 118 based on them.

3.0 Method and Apparatus for Data Model Prediction

A detailed description of example approaches for data model prediction are now described in the context of an Enhance Device Interface (E-DI) system that provides an XML programmatic interface for configuring network devices from Cisco Systems, Inc., San Jose, Calif., that run Cisco IOS® Software and Cisco CATOS Software. The E-DI system allows a network management application to configure Cisco devices using the IETF NETCONF protocol. The description in this section is provided merely as one example of how to make and use the general approaches that are otherwise described and claimed herein. Thus, the embodiment of this section is intended to provide one clear example but not to limit the full scope of the invention, which is set forth in the appended claims.

In overview, the E-DI XML interface provides for device configuration using a data model that follows closely the native device CLI command structure. The E-DI can replicate a complete CLI command set of the managed devices externally. Thus XML interface covers a complete set of capabilities that are available through the CLI. Furthermore, because E-DI uses an automated CLI learning process, E-DI can support to a wide variety device versions and software versions.

A foundation of XML interface includes a data model definition and processes providing for the transformation from XML to CLI (X2C) and CLI to XML (C2X). The following subsections describes the E-DI data model or Intermediate Data Model (IDM), an algorithm for deriving the data model from the CLI knowledge base, and algorithms for the X2C and C2X transformations.

In one embodiment, the E-DI interoperates with an automatically generated CLI command knowledge base. By generating the XML data model using a generic rule from the CLI knowledge base, E-DI can perform the X2C and C2X transformation. Therefore, the XML interface is not a separate feature that needs to be developed separately; instead, once the CLI is supported for a specific device, the XML interface is automatically available. Further, in an embodiment the E-DI data model, as its CLI counterpart, is device and software version specific, and reflects the true capabilities of the device.

3.1 EDI Runtime System

FIG. 11B is a block diagram showing one embodiment of an EDI runtime system. In one embodiment, EDI runtime system 130 comprises an IDM builder (1), X2C transform module (3), and C2X transform module (4). IDM builder (1) receives a CLI view 132 that provides a view of one or more CLI commands from a CLI knowledge base 140. IDM builder (1) builds an intermediate data model based on the CLI knowledge base, resulting in creating and temporarily storing an IDM data structure or IDM View (2). X2C transform module (3) and C2X transform module (4) are respectively responsible for transforming XML data 136 to one or more CLI commands 138 and CLI to XML, based on the IDM view (2). An XSD generator 134 also may interact with IDM view (2) to generate one or more XSD streams or documents.

In an embodiment, at run-time the IDM is built from the CLI View 132 on demand, as X2C and C2X transformation for a specific device type and software version is needed. To conserve memory, the IDM may be removed from memory when it is not used for an extended period of time.

3.2 CLI View Data Structure

The CLI View 132 is a graph of Parser Nodes that an E-DI CLI parser uses to parse or validate CLI that is entered by a user at an E-DI console. A CLI View 132 is created for each IOS CLI mode. Thus, a complete CLI knowledge base is composed of a set of CLI Views 132 bound by the entry commands that lead one view to another view.

In an embodiment, E-DI CLI Views 132 are packaged or organized per device family and major IOS release. For example, one package of the CLI knowledge base 140 is provided for the Cisco 29xx router family with IOS version 12.2. This document describes details of CLI structure that are relevant to IDM conversion.

Figure 2:
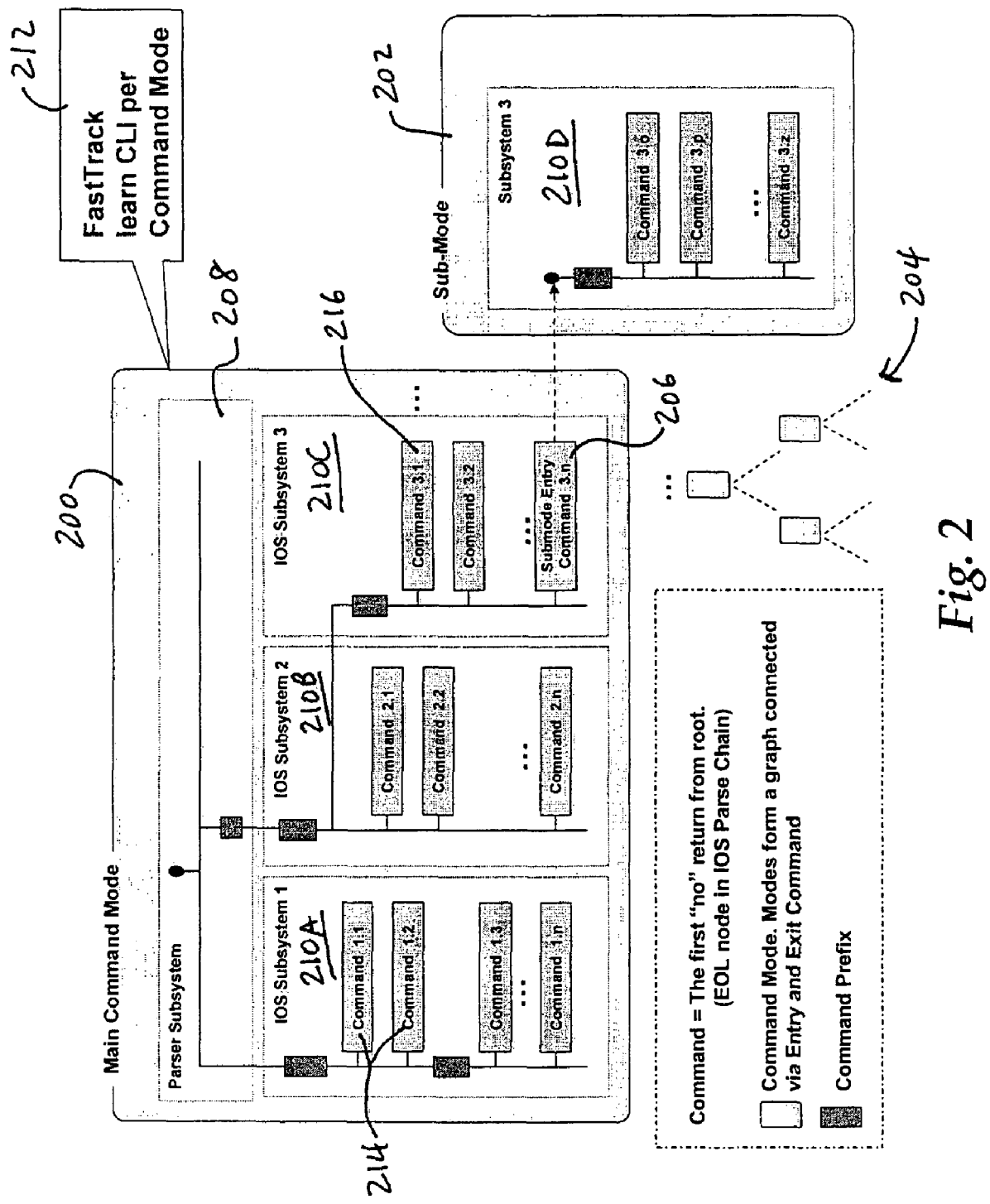
FIG. 2 is a block diagram showing organization of command modes in a network operating system.

FIG. 2 is a block diagram showing organization of command modes in a network operating system such as used in Cisco IOS Software. From the perspective of an external CLI user, commands are organized into a hierarchy of command modes as indicated by tree 204. A main command mode 200 has one or more sub-modes 202. A user enters a sub-mode 202 using an entry command 206 and exits the sub-mode using an exit command. In an embodiment, an external process, which is termed a FastTrack process 212 in one example embodiment, learns device CLI commands for each command mode. Therefore, the E-DI CLI knowledge base 140 is also organized according to the CLI modes, having one CLI View 132 per CLI mode.

As a comparison, FIG. 2 also shows how the commands within a CLI command mode relate to internal functional subsystems of a network operating system. The main command mode 200 includes a parser subsystem 208 and one or more functional subsystems 210A, 210B, 210C. The main command mode 200 is associated with commands 214, 216 contributed by many subsystems. Typically a command from a particular subsystem 210A, 210B, 210C will start with the same prefix, for example, "aaa <xxx>". Other sub-modes, other than the interface sub-modes, generally contain commands contributed by a specific subsystem.

Figure 3:
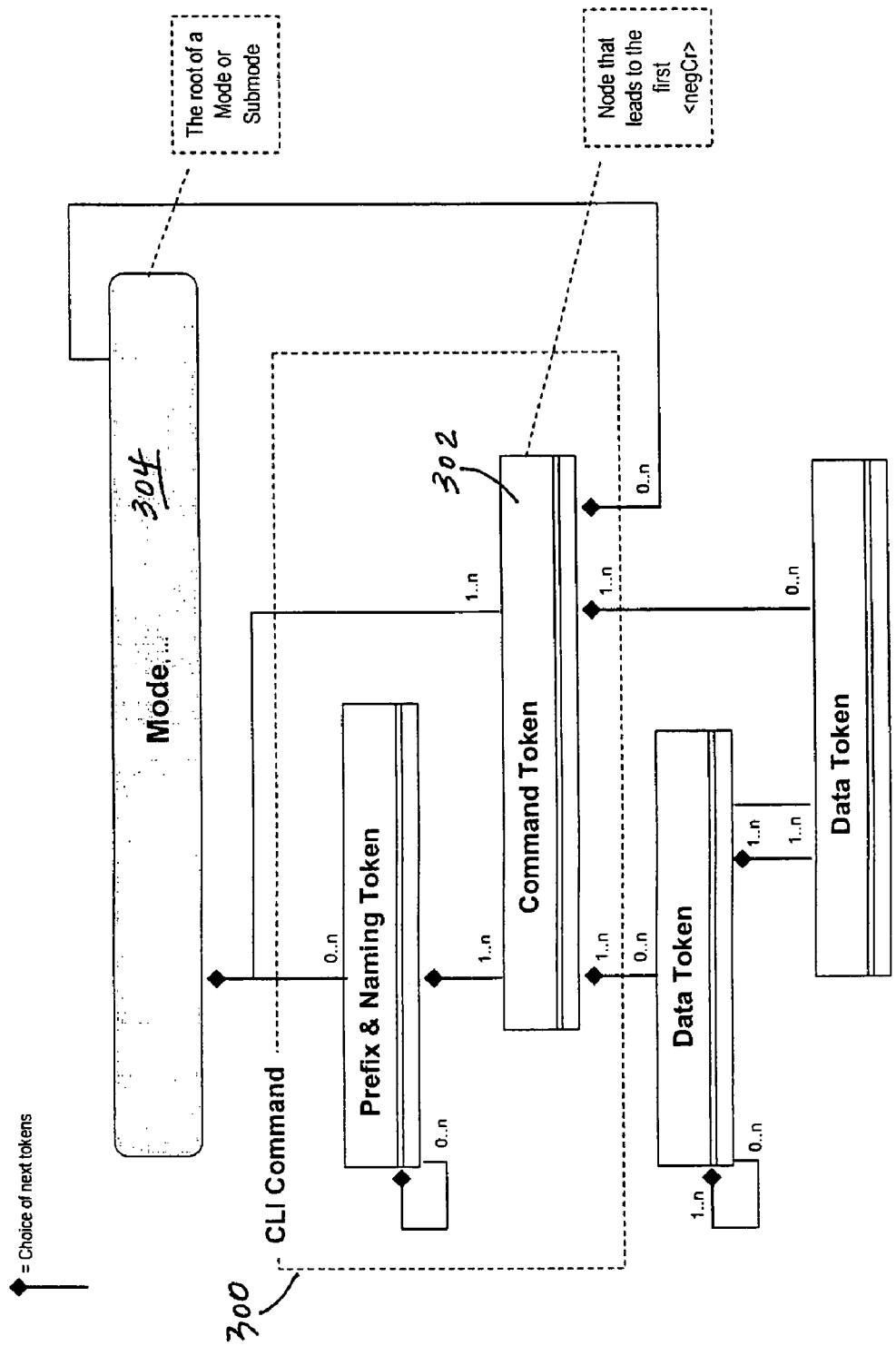
FIG. 3 is a block diagram of an example network device command using a containment model.

FIG. 3 is a block diagram of an example network device command structure using a containment model. An E-DI CLI parser graph, described below, uses the containment model. In the containment model, a token such as command token 302 of a CLI command 300 contains zero or more tokens that represent valid tokens that can follow according to the syntax of the associated command.

Figure 5A:
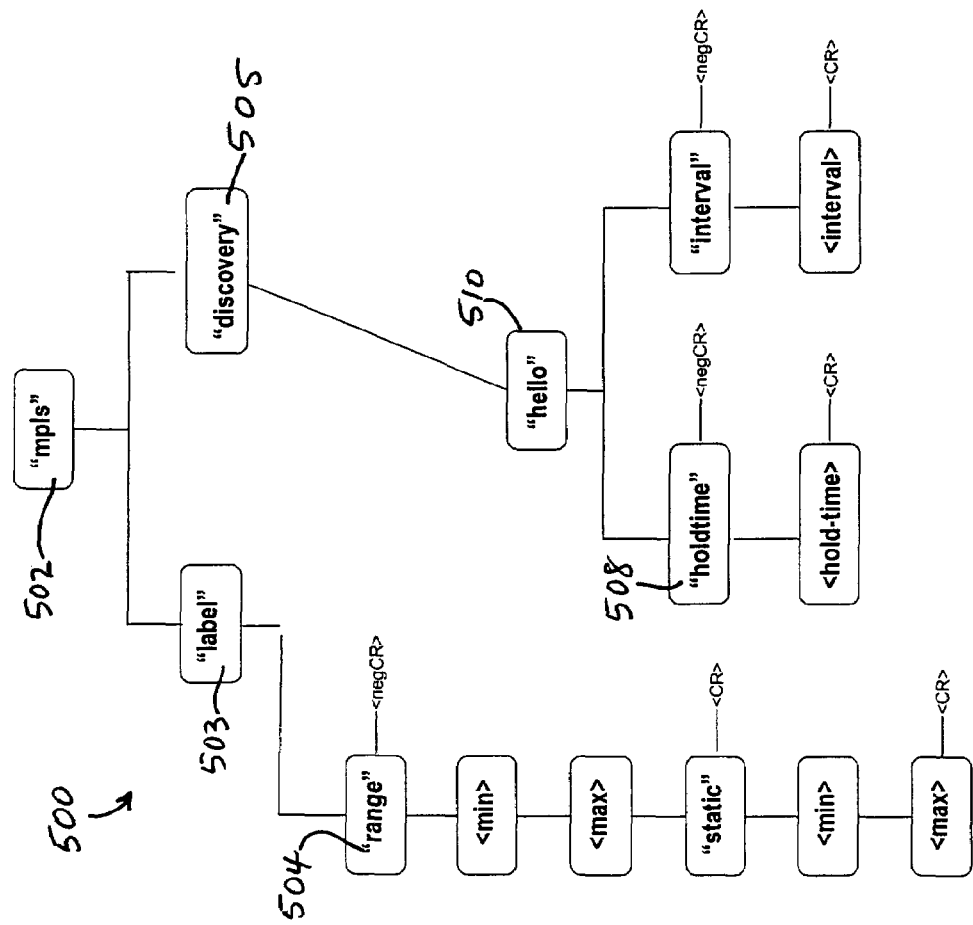
FIG. 5A is a diagram showing a first example CLI parser graph.

A particular token may contain a <cr> (carriage return) tag that specifies that the command can terminate there, as seen in FIG. 5A, described further below. A particular token also may contain a <negCr> (negation carriage return) tag that specifies that the negation or "no" version of the command can terminate there. Proceeding downward from a root node such as mode node 304, the token that has the first <negCr> (from the root) can be used to specify a delineation of the command. A delineating node accepts a "delete" management operation that deletes the entire command from the IDM. Information below the delineating node represents parameters of the command, while information above the delineating node is grouping criteria (prefix) or a naming parameter (key) of the command.

In an embodiment, a command is defined strictly syntactically based on the first <negCr> position, not based on the actual semantic of the command. A CommandContainer may be a Container of one or more semantically separate but related commands.

In an embodiment, the CLI command structure is represented in E-DI as a graph of ParserNodes. Child nodes represent choices of next acceptable tokens following the parent node. A ParserNode can be visited from multiple parent nodes; thus a sub-graph or a node can be shared or referenced from multiple parent nodes. A node can also refer back to one of its ancestor nodes, creating a loop. Excluding any loops, if the shared sub-graphs or nodes were duplicated the structure would appear as a tree of CLI tokens.

Figure 4:
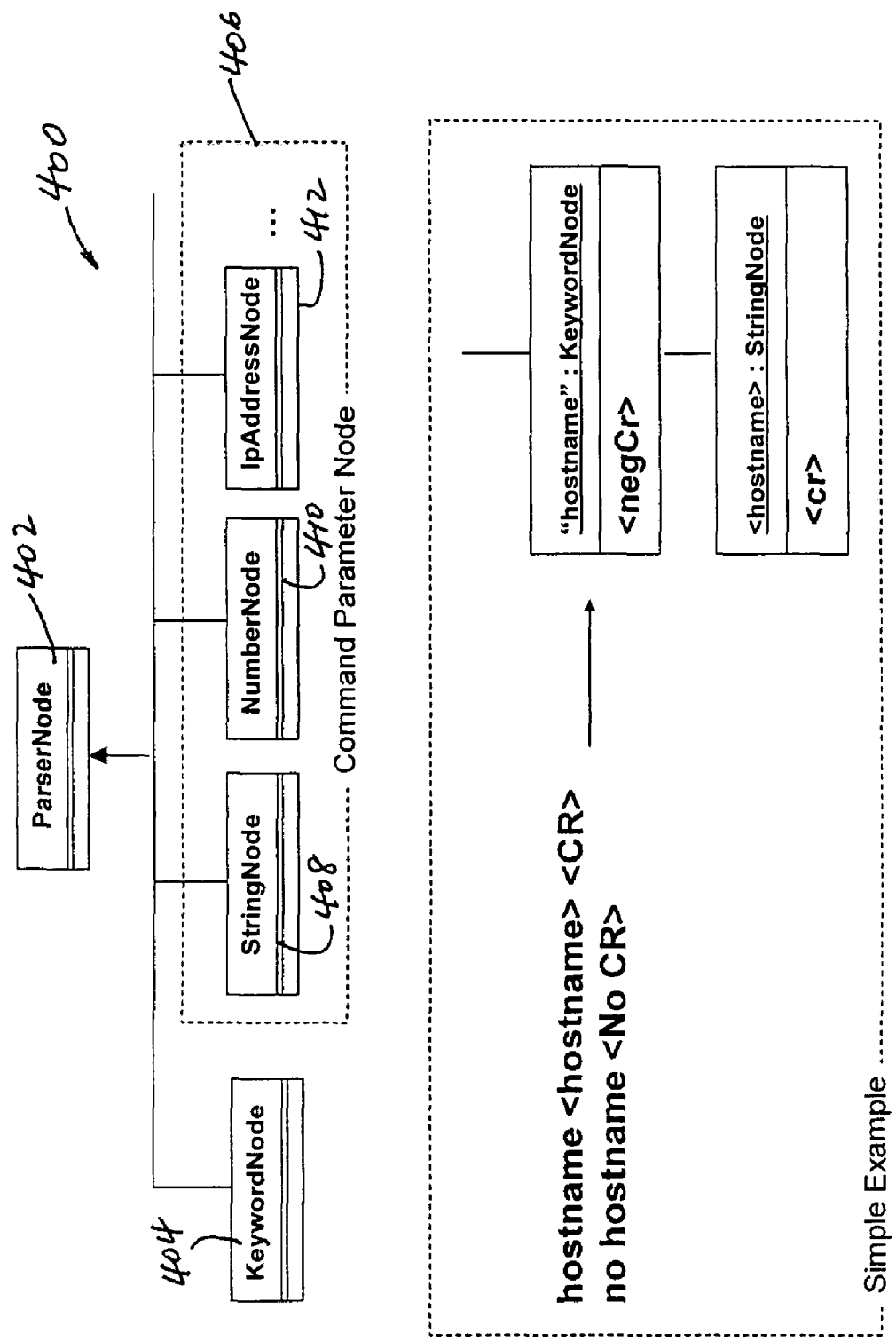
FIG. 4 is a class diagram of object classes that may be used to implement a CLI command structure.

FIG. 4 is a class diagram of object classes that may be used to implement a CLI command structure. A ParserNode class 402 comprises subclasses identified as a KeywordNode class 404, StringNode class 408, NumberNode class 410, and IpAddressNode class 412. The class and its subclasses may be implemented in an embodiment using an object-oriented computer programming environment with a language such as JAVA, C++, etc.

Each subclass represents a type of CLI input token. There are two basic categories of tokens: keyword token and parameter tokens. A keyword token is represented by the KeywordNode class 404, and parameter tokens are represented by StringNode class 408, NumberNode class 410, and IpAddressNode class 412, which are associated with command parameter nodes 406.

Figure 5B:
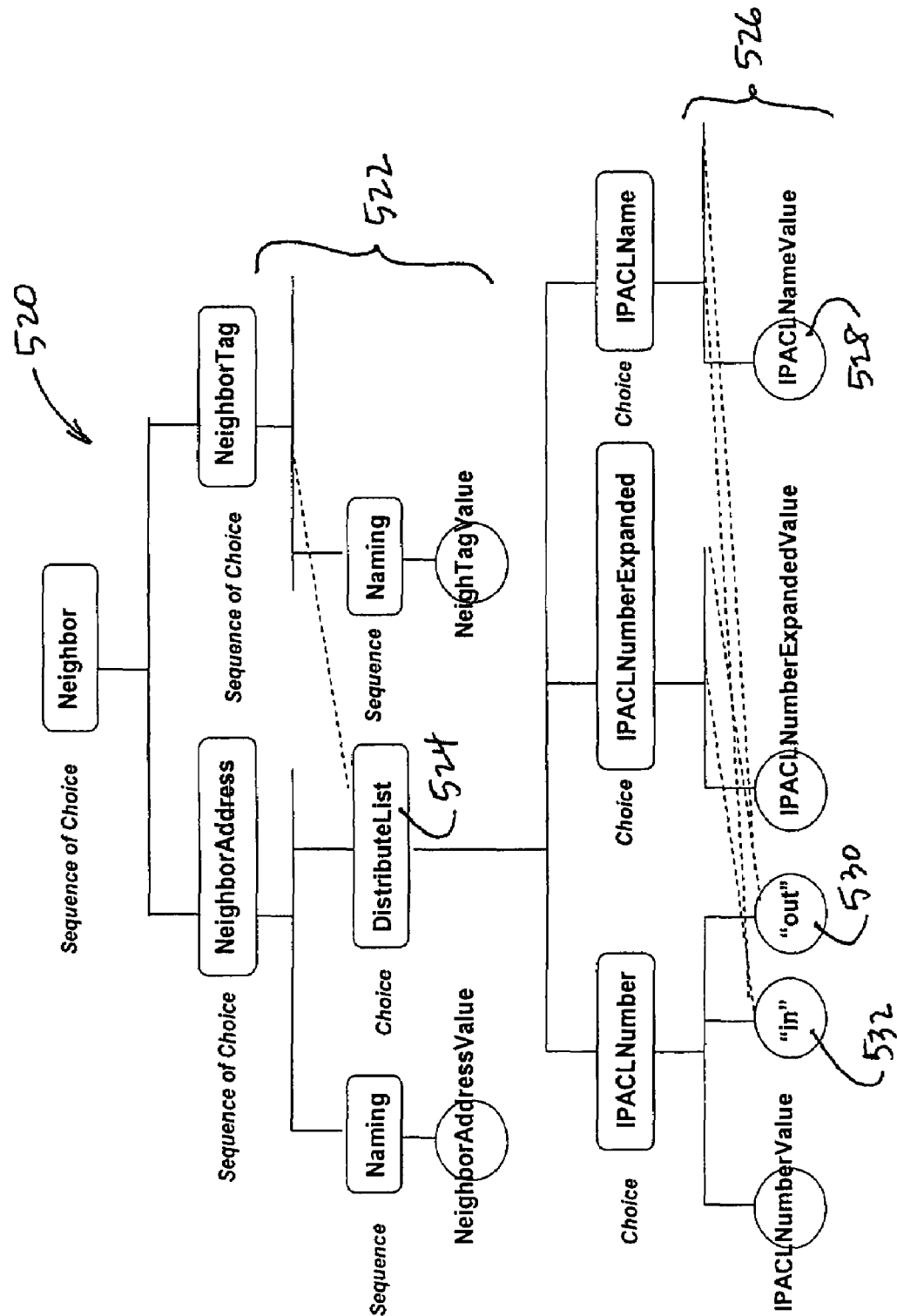
FIG. 5B is a diagram showing a second example CLI parser graph.

A simple example of the ParserNodes for a simple hostname command consists of only two nodes. More complex examples are shown in FIG. 5A, FIG. 5B. FIG. 5A is a diagram showing a first example CLI parser graph, and FIG. 5B is a diagram showing a second example CLI parser graph. Referring first to FIG. 5A, a parser graph 500 represents the following three commands:

1. "mpls" "label" "range" <min><max> ["static"<min><max>]
2. "mpls" "discovery" "hello" "holdtime"<holdtime>
3. "mpls" "discovery" "hello" "interval"<interval>

The commands represented in the graph may be delineated by walking the graph from the root "mpls" node 502 downward until the first <negCr> tag is reached in a branch of the graph. For example, the first command is delineated by visiting "mpls" node 502, "label" node 503, and "range node 504, which has a <negCr> tag. The third command is delineated by nodes 502, 505, 510, 508, which also has a <negCr> tag.

The second example of FIG. 5B illustrates a more complex graph in which a sub-graph and nodes are shared or referenced by multiple nodes. Specifically, graph 520 comprises a sub-graph 522 that a "DistributeList" node 524 references. Further, an "IPACLName" sub-graph 526 is referenced by both "in" node 532 and "out" node 530.

3.3 Intermediate Data Model Data Structure

Figure 6:
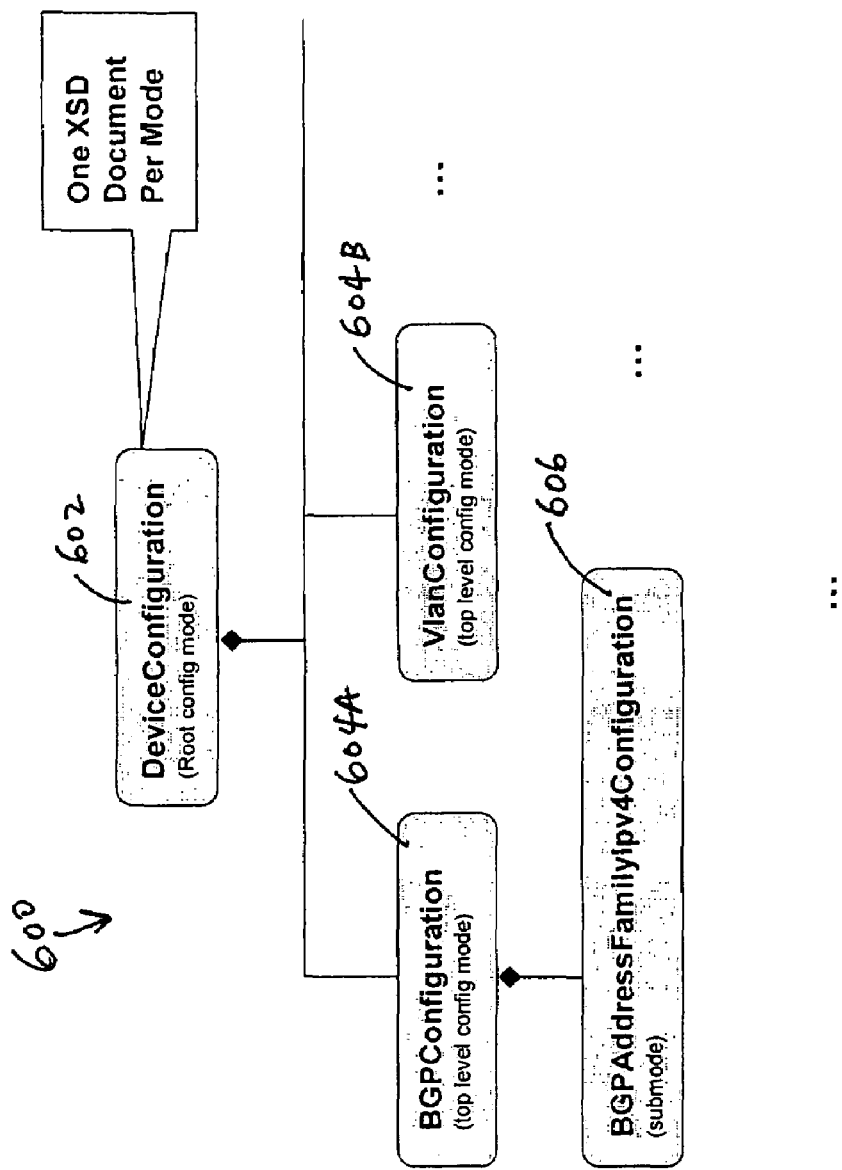
FIG. 6 shows a sample hierarchy of an IDM package.

In an embodiment, the IDM data model is packaged in a manner that mirrors the E-DI CLI view packaging. For each CLI command mode, a package is created. FIG. 6 shows a sample hierarchy of an IDM package. In one embodiment, a hierarchy 600 comprises a root node 602 representing a root configuration mode and one or more child nodes 604A, 604B representing top level configuration modes. Each child node 604 may have one or more further child nodes 606 that represent corresponding command sub-modes. In an embodiment, hierarchy 600 is defined in one XSD document per command mode.

Since a common CLI View package may be shared across different devices in a device family and across devices that use different software versions, the IDM package associated with the shared CLI View may be shared as well. No IDM specific sharing is required.

According to an embodiment, the E-DI model provides for automatic definition of the data model from CLI and for automatic run-time transformation from XML to CLI and from CLI to XML. IDM automated model generation is facilitated using a data model that follows the CLI command structure. Elements and grouping of elements of the data model reflect the syntactical structure of the CLI and not necessarily the semantics of the elements.

Thus, the IDM structure matches almost one-to-one with the CLI model structure. In general, one leaf node of a CLI parser graph is associated with one leaf IDM node, such as a Property that represents a Value or Parameter. Further, one non-leaf IDM CLI node produces one non-leaf IDM node, namely a Container, and an optional leaf IDM node, which is a Property. A shared sub-graph in the CLI model also translates into a shared sub-graph in the IDM. Likewise, a loop in the CLI model translates into a loop in the IDM.

Figure 7:
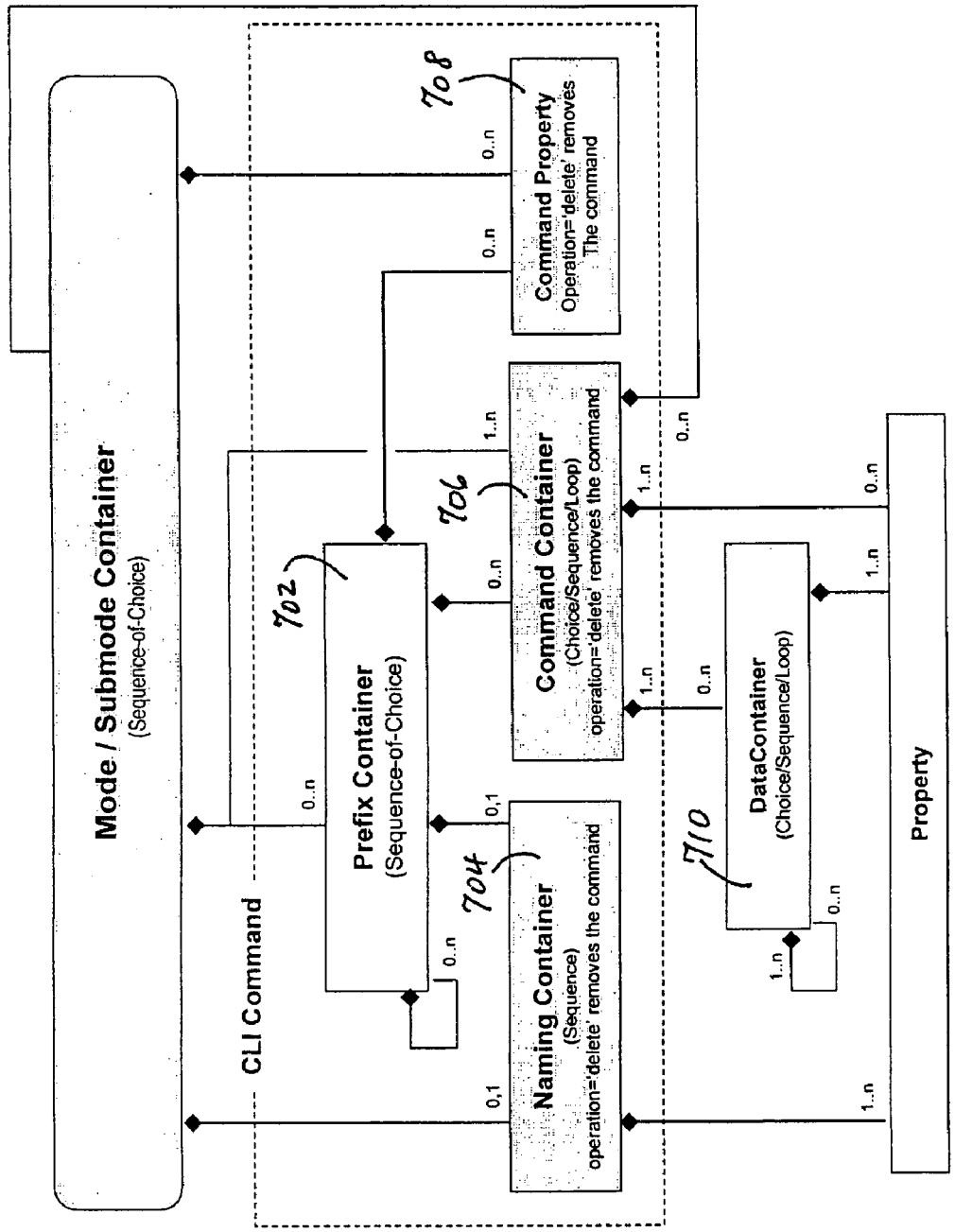
FIG. 7 is a diagram that illustrates an example structure of the intermediate data model.

FIG. 7 is a diagram that illustrates an example structure of the intermediate data model. Non-leaf IDM nodes, such as nodes 7023, 704, 706, are Containers, and each leaf IDM node 708 is a Property. A leaf IDM node may be a Container that that represents a loop reference, as described further below.

To relate the IDM with the CLI commands from which it is derived, Containers are categorized, based on their position relative to the Mode and Command boundary, into CLI mode/submode ModeContainer, PrefixContainer, CommandContainer, and DataContainer objects.

A ModeContainer indicates the boundary of a CLI mode or submode.

A CommandContainer indicates the boundary of a CLI command. Some very simple commands may contain only one property and are directly contained under a ModeContainer or PrefixContainer. In this case, the CLI command boundary is the Property node. The definition of what a Command is strictly defined based on the first <negCr> position, not based on the actual semantic of the command. A CommandContainer may in-fact be a Container of one or more semantically separate but related commands.

A NamingContainer is a special container created to group the command's naming properties or keys for commands that can have multiple instances (non-singleton).

The IDM structure resembles a tree, but some nodes can have extra references from other parent nodes. These multi-reference IDM nodes correspond to multi-referenced CLI nodes.

In addition to categorization based on position, each Container can be categorized based on the order of its child nodes. Such an order relates to the syntactical constraints of an IDM XML configuration request for use in the X2C and C2X transformation processes, and not the model structure in the Device component. This ordering approach is consistent with CLI configuration rules in which the same command that affects the same data can appear more than once in configuration file, and the last command instance overrides all other previous instances of the same command.

In an embodiment, IDM uses, as Orders: Choice, Sequence, Sequence-of-Choice and Loop. Choice means that there can be only one child under the Container and it must be one of the child Containers or Properties. Sequence means that the child Containers or Properties must appear in the defined sequence. Sequence-of-Choice is a Sequence of zero or more members of the Choice. Loop is represents a looping or list structure; in XSD this is a sequence of group that contains a sequence and choice tags.

Figure 8:
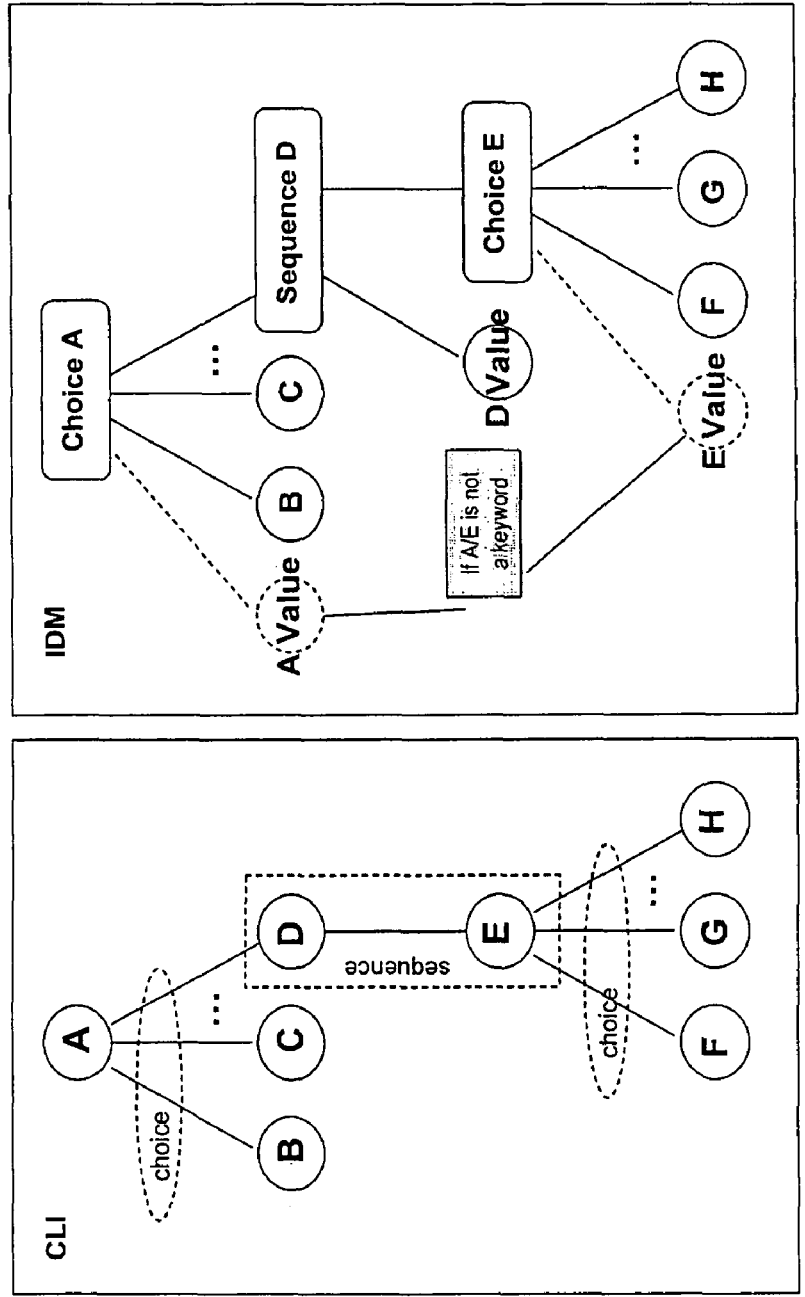
FIG. 8 illustrates the general structure of an intermediate data model instance.

FIG. 8 illustrates the general structure of an intermediate data model instance. FIG. 8 shows how the CLI Model structure and the IDM structure are related. In general, one CLI Parser node maps to one or two IDM nodes: a Container, a Container and a Property or just a Property. In some cases a CLI Parser node does not map to any IDM node. Since a non-leaf CLI node denotes a Choice, most IDM Containers are either a Choice or a Sequence-of-Choice.

Since a non-keyword parser node represents a value, the non-keyword parser node maps to both a Container and Property. For example, CLI node D maps to IDM Sequence D and Value D. Generally, the extra Property in the mapping is the Value Property of the Container, which is treated as part of the Container Order. A Value Property that appears above the Command boundary is the Key Property Value, which is defined inside an extra Container called Naming. Thus, a non-keyword parser node maps into either a Choice Container and a Value, or a Sequence-of-Choice Container and a Naming Container.

Figure 9A:
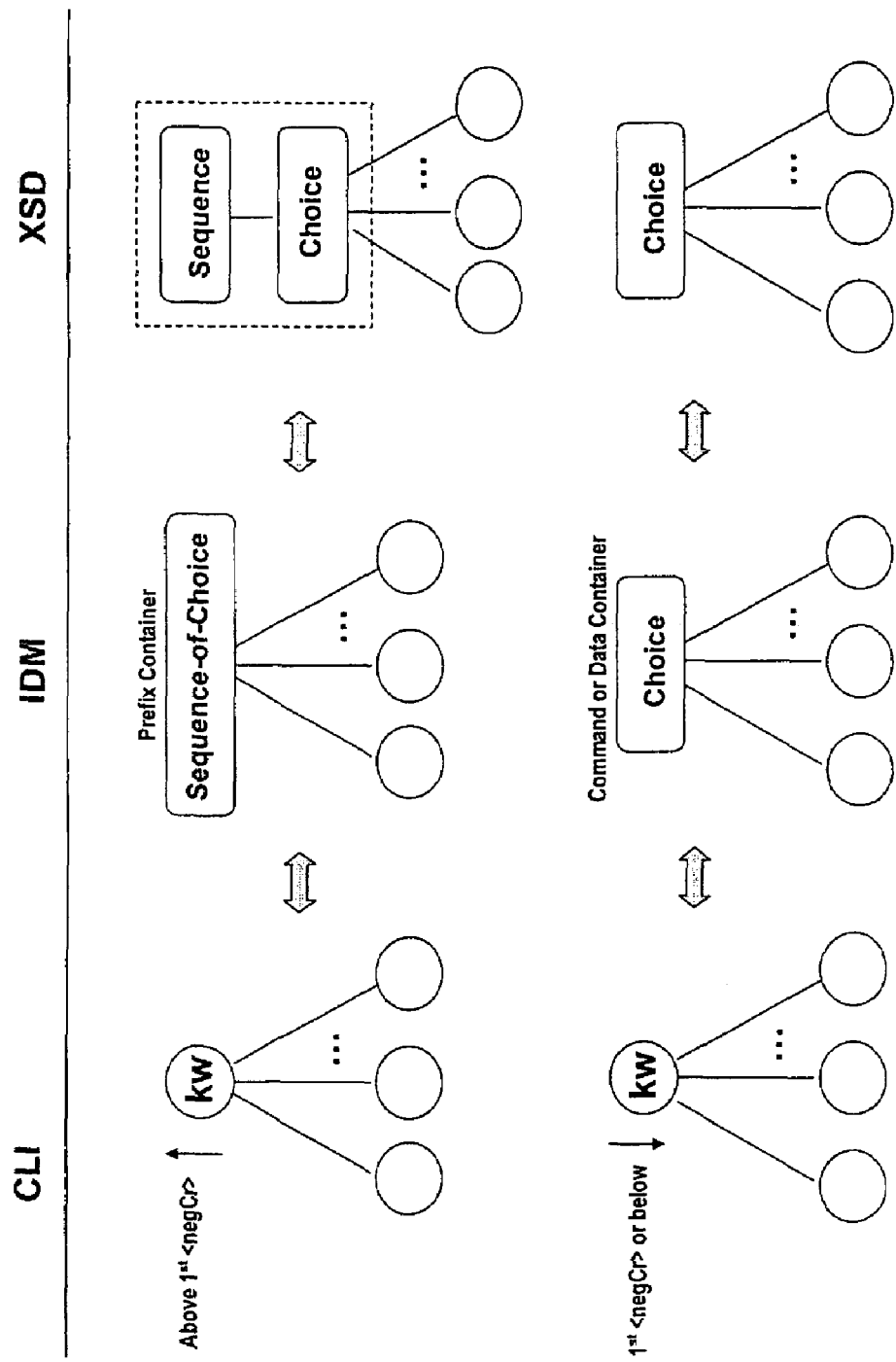
FIG. 9A, FIG. 9B are diagrams showing the general mapping between a Keyword parser node and a Non-keyword parser node, and their corresponding IDM container and XSD structure.
Figure 9B:
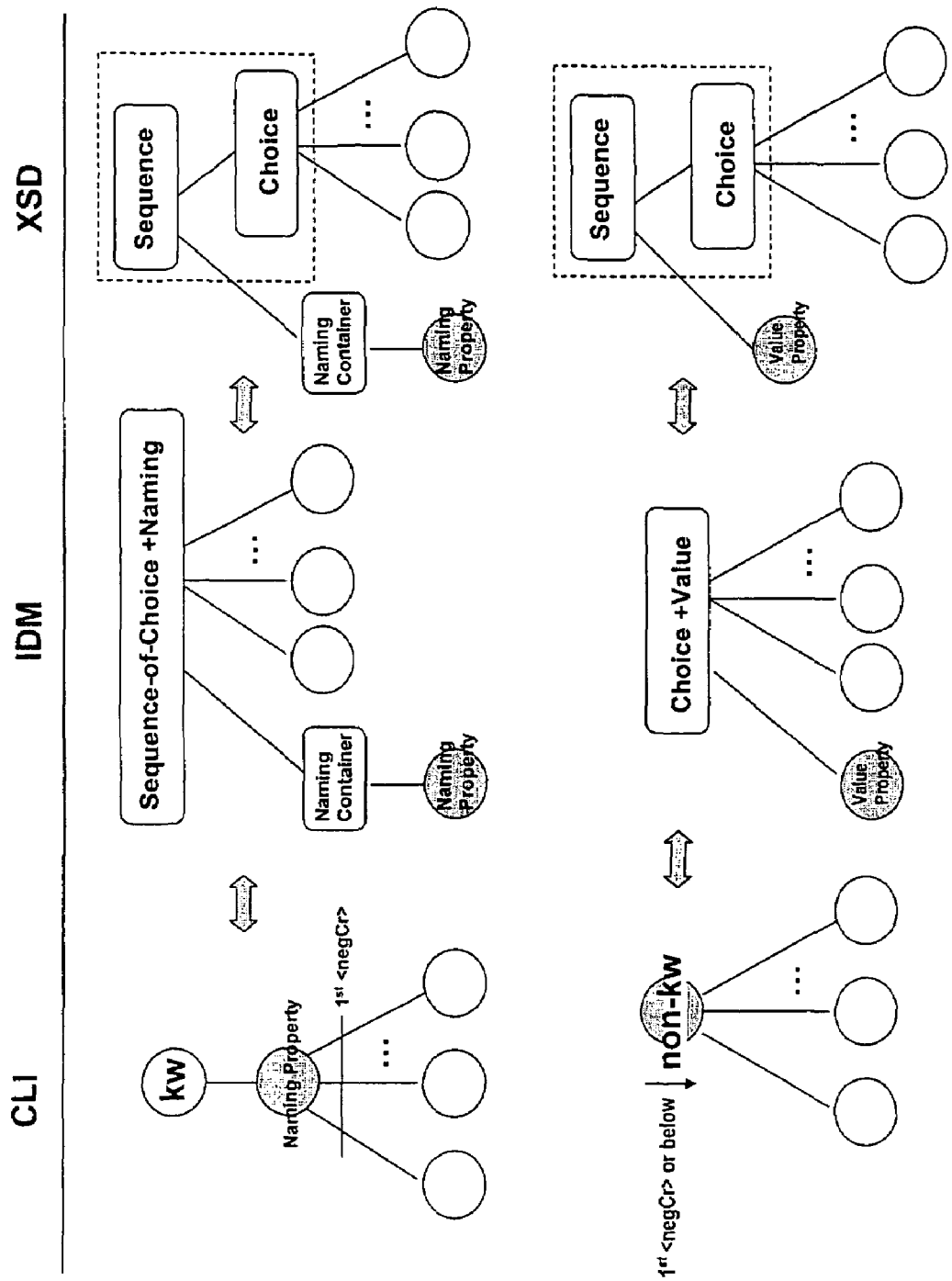

FIG. 9A, FIG. 9B are diagrams showing the general mapping between a Keyword parser node and a Non-keyword parser node, and their corresponding IDM container and XSD structure. FIG. 9A shows a mapping for a keyword node container. FIG. 9B shows a mapping for a non-keyword node container.

In one embodiment, two exceptions to the Sequence-of-Choice and Choice Container types are provided: Sequence and Loop. A Sequence is created in a few cases in which a non-branching series of CLI parser nodes is found. In IDM a Sequence can only contain leaf Property nodes, and an optional Choice or Sequence-of-Choice last child. For example, structure (A (B|C)D) is invalid; instead it will be expressed as (A(BD+CD)).

In one embodiment, by mirroring the CLI Model structure, an IDM Container or Property name is derived from their associated CLI node. The name of an IDM Container represents a group of nodes that syntactically follow that Container node, but does not necessarily represent a semantic grouping of the child nodes.

A loop container is created when a CLI parser node revisit one of its ancestor node or itself. In IDM, the resulting loop is flattened, and instead of creating an infinite nesting structure, an infinite sequence is created. That is, instead of <x><x>..., the tags <x/><x/>.... are used. The use of loop containers is discussed further in this document.

Figure 9C:
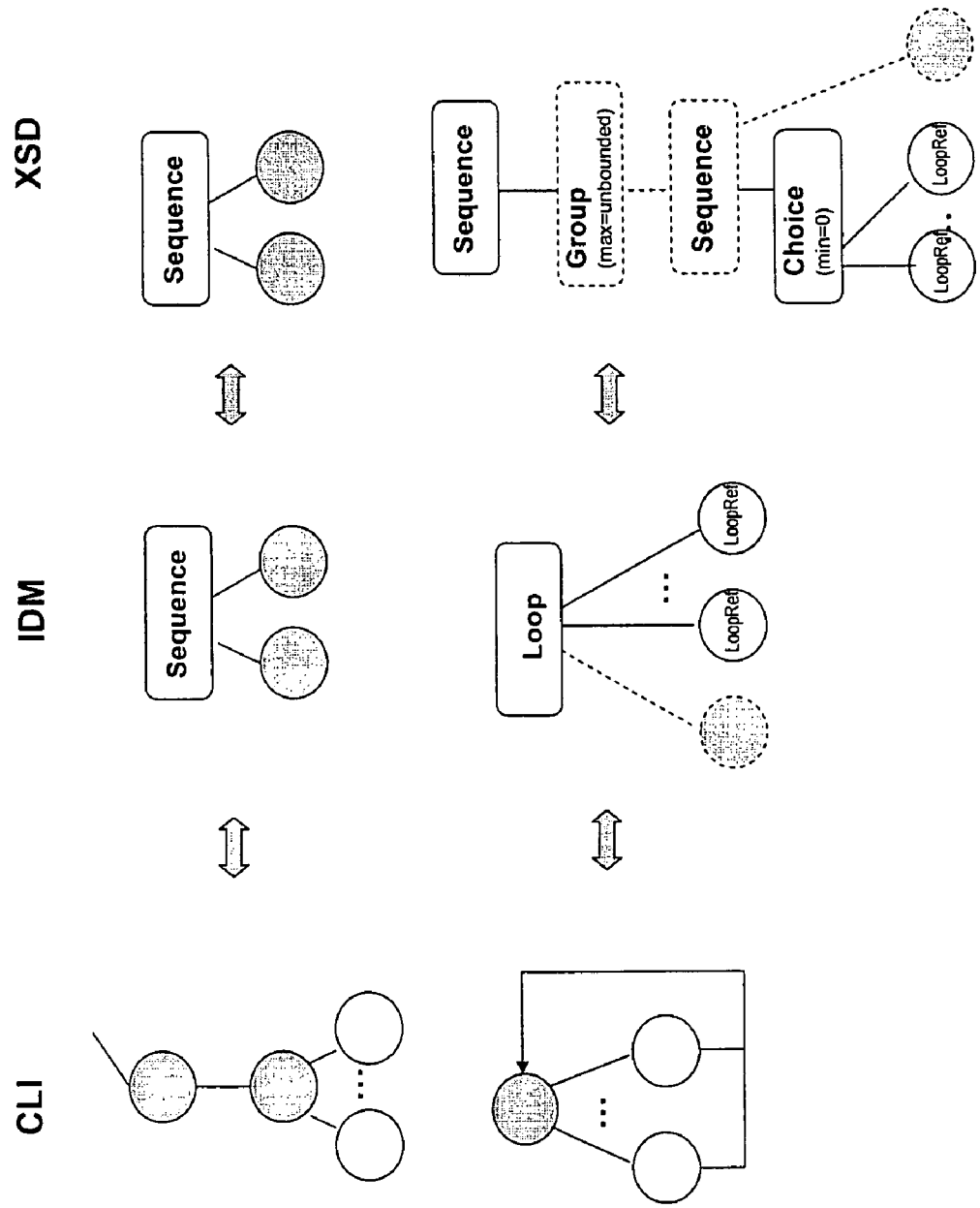
FIG. 9C illustrates Sequence and Loop Containers and their associated CLI and XSD structure.

FIG. 9C illustrates the Sequence and Loop Containers and their associated CLI and XSD structure.

Figure 10A:
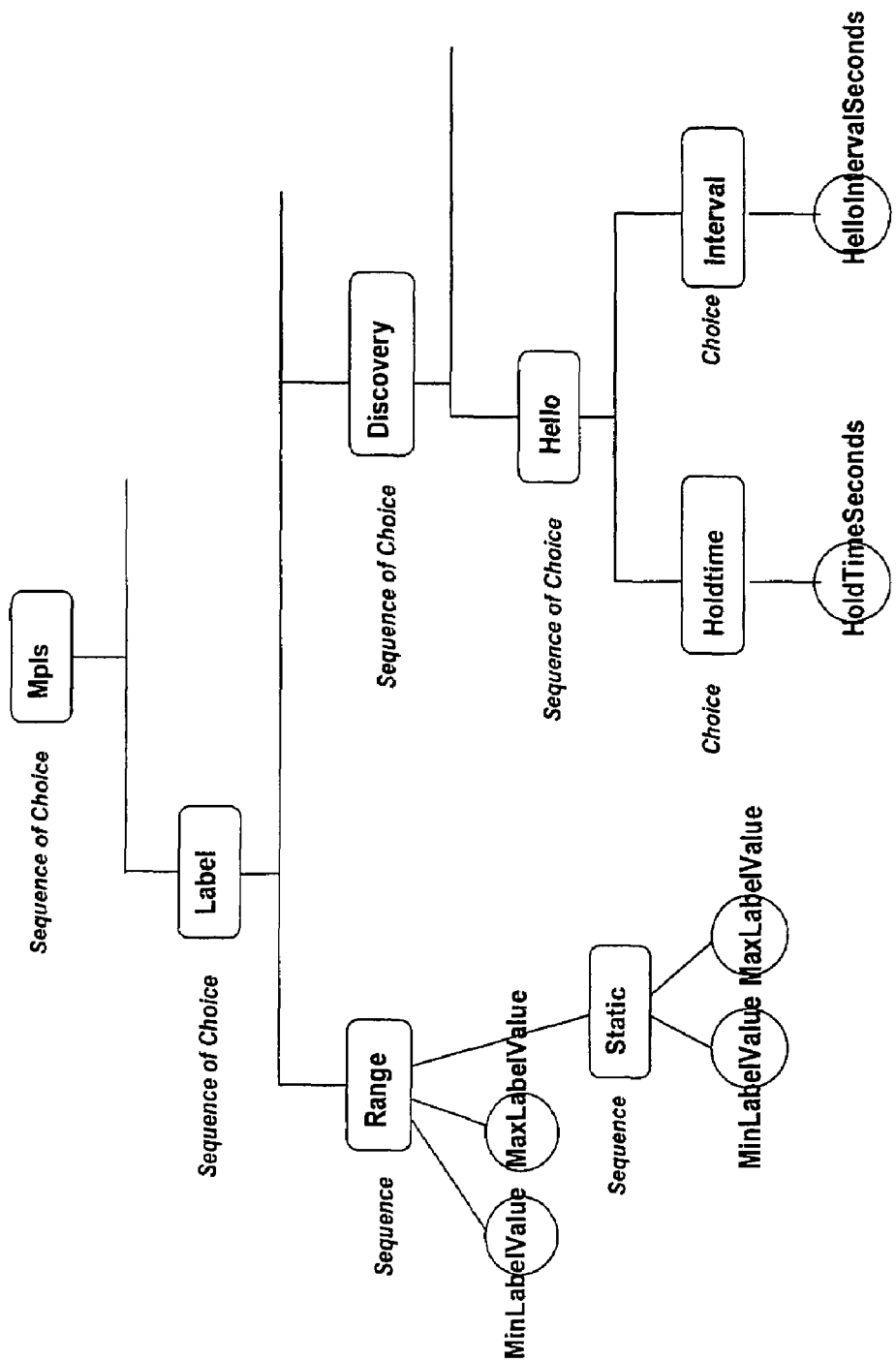
FIG. 10A, FIG. 10B are diagrams of IDM data structures based on and corresponding to FIG. 5A, FIG. 5B.
Figure 10B:
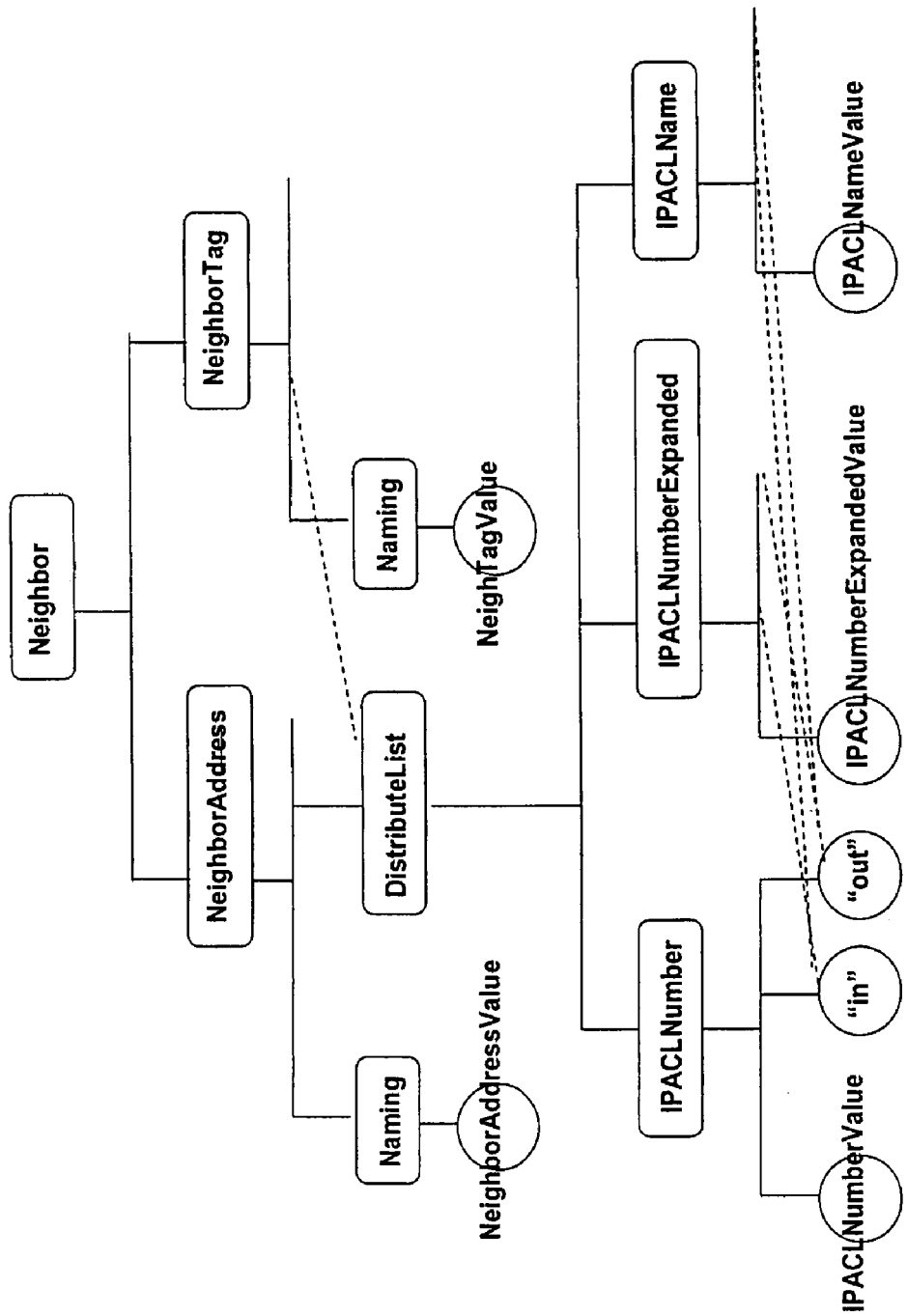

FIG. 10A, FIG. 10B are diagrams of IDM data structures based on and corresponding to FIG. 5A, FIG. 5B. Referring first to FIG. 10A, a comparison with FIG. 5A shows that the node sequence "mpls" "label" "range" is converted into a Sequence, and that the other containers are transformed to a Choice node or Sequence-of-Choice node depending on the command boundary. FIG. 10B presents a sample IDM with multi-referenced nodes.

Figure 11:
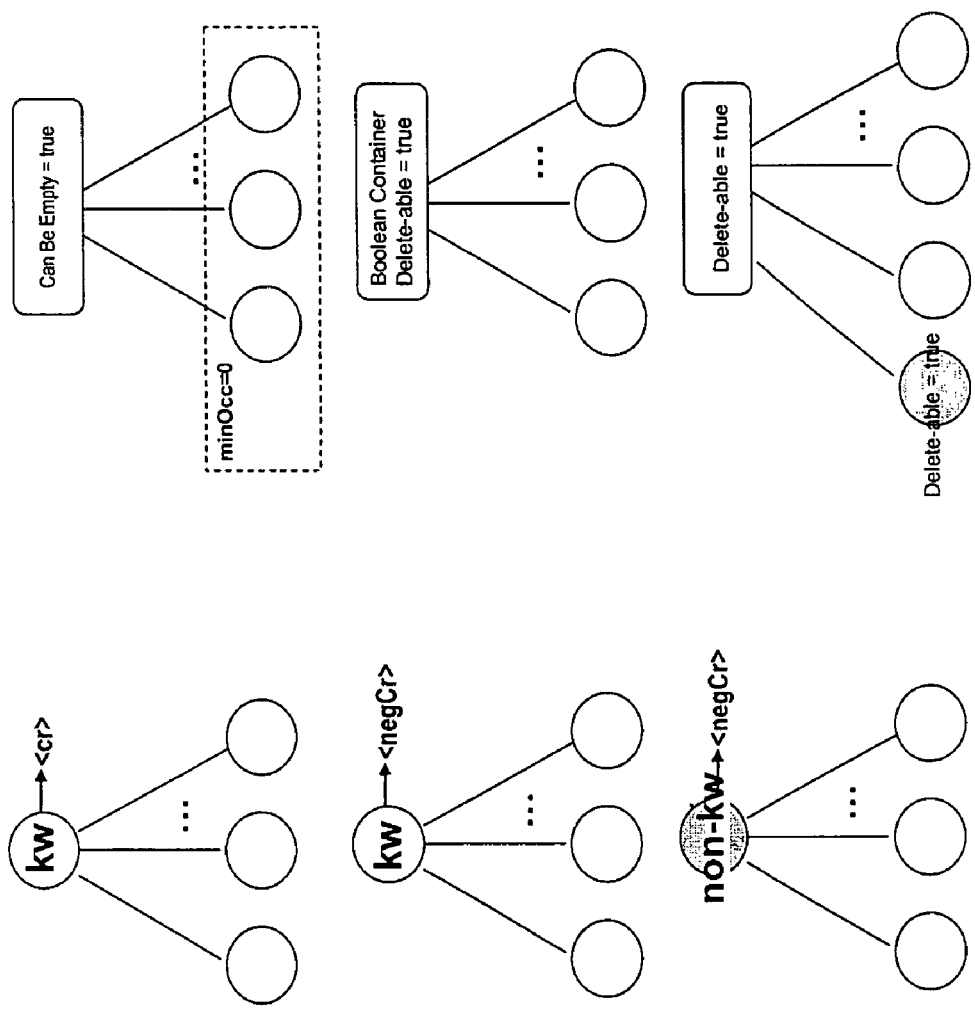
FIG. 11 illustrates delete operation and cardinality relationships.

An embodiment of the IDM also supports a delete operation and cardinality functions. A close mirroring of the CLI model structure and the IDM structure is also reflected in how the CLI <cr> and <negCr> tags map to delete operations and cardinality concepts in the IDM. A <cr> tag in a CLI parser node means that the IDM Container associated with that node can be empty or does not require any child nodes. Therefore, the child nodes have a cardinality of minOcc=0 (optional). A <negCr> tag in a CLI parser node corresponds to a Container or Property that accepts a delete operation, or that can be empty. FIG. 11 illustrates the foregoing relationships.

In one embodiment, the effect of a delete operation is determined according to the following set of rules. The meaning of a delete operation depends on where the delete operations are specified. A delete operation specified in a NamingContainer node deletes a multi-instance command identified by the name inside the NamingContainer. Semantically, a delete operation specified in a NamingContainer node deletes multiple related configuration nodes that are identified by the key property. A delete operation in a CommandContainer node deletes a singleton command. For certain CommandContainer nodes, the delete operation deletes multiple related configuration sharing the same prefix. A delete operation in a Command Property node deletes a simple singleton command. A delete operation in the DataContainer or simple Property node sets the data to false or null.

According to one embodiment, the IDM provides X2C and C2X Mapping Data. Since the IDM is automatically generated from CLI data, and the IDM and CLI structure are similar, a relationship between the generated IDM node and CLI node is known. The mapping of all IDM Properties and an IDM Container with corresponding CLI nodes is captured for use in performing X2C and C2X transformation processes. Since the mapping is primarily done through the IDM Property, a CLI node maps to a Property if a Property is created from that CLI node. If only a Container is created, then the CLI node maps to the Container.

Figure 1B:
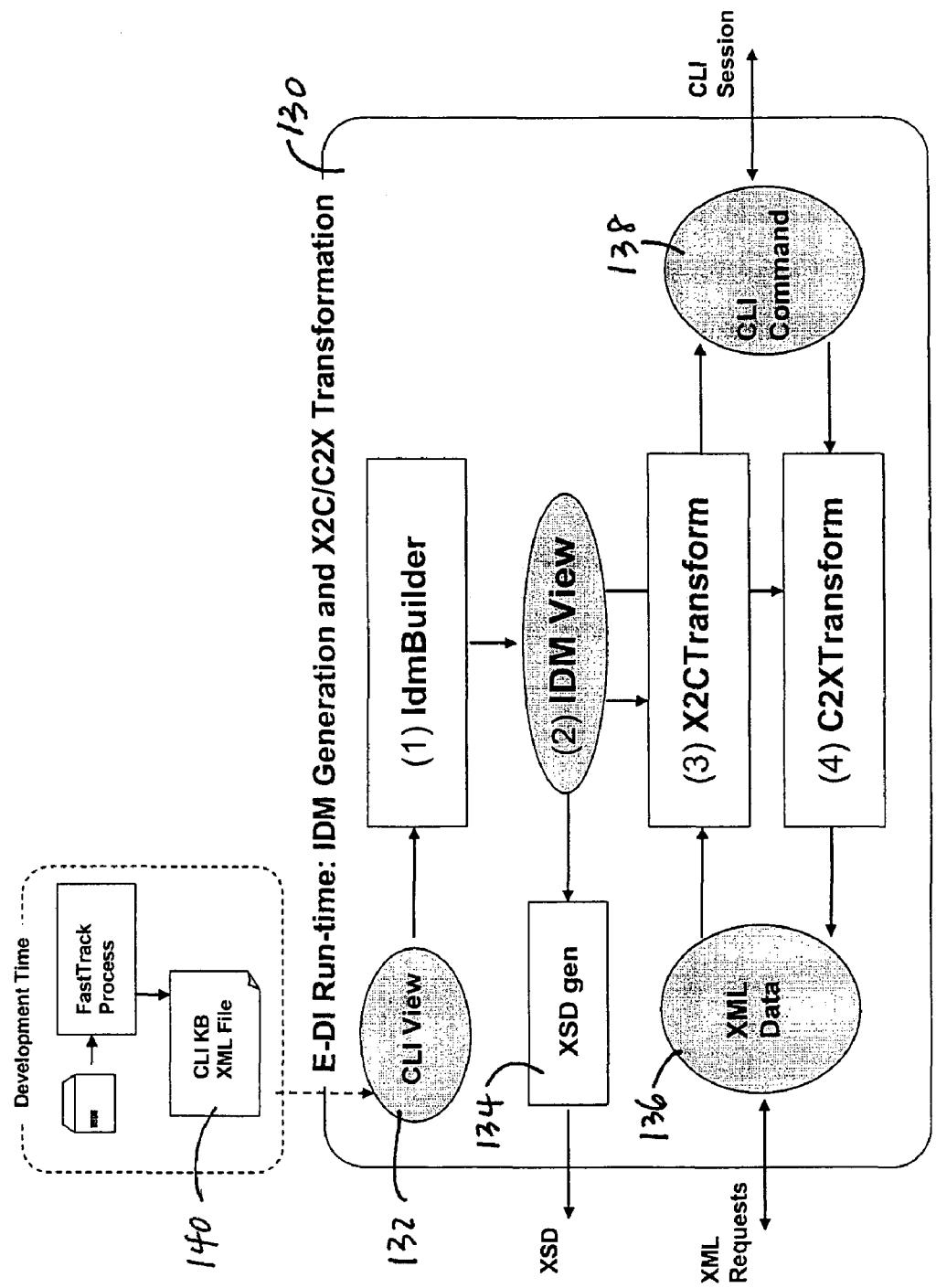
FIG. 1B is a block diagram showing one embodiment of an EDI runtime system.

3.4 Building an Intermediate Data Model Based on a Command Line Interface Data Model According to one embodiment, the IdmBuilder module (1) FIG. 1B primarily determines, from an input CLI View 132, whether a CLI View element represents a Container or Property, the Container type, and the Order. These characteristics determine the basic structure of the IDM, to which the following additional information is added: Name of Container and Property; Description; Property type; Naming Property; Cardinality; and mapping information between IDM and CLI.

In an embodiment, the IDM is created using a recursive algorithm, implemented in appropriate software hosted on a general-purpose data processor configured as a network management station, which traverses the CLI parser graph. For example, a method Build( ) may be implemented according to the pseudocode of Table 2:

TABLE 2

PSEUDOCODE FOR BUILD METHOD

Build (ParserNode,
 ParentParserNode,
 ParentContainer,
 PreviousBooleanProperty,
 UnusedName)
 {
1. Consume non-branching (down & up) keyword Parser Nodes and save the string for name.
2. Create a Container for ParserNode?
 Determine Container name.
 Use PreviousBooleanProperty and UnusedName for name conflict resolution.
3. Create a Property for ParseNode?
 Determine Property name.
 Use PreviousBooleanProperty and UnusedName for name conflict resolution.
 Add New Property to New Container or ParentContainer.
4. Recursively call Build( ) for each child nodes.
 }

The following further describes the rules used within the Build( ) method given in the example of Table 2.

Determining whether a Container or Property is represented is the primary decision in building the IDM. The decision determines the structure of the IDM model and affects the naming decision as well. The primary criteria in determining the presence of a Container or Property are the CLI parser node's child node count and the presence or absence of the <cr> and <negCr> tags. Generally, in an embodiment, a leaf CLI node maps to a Property, and a non-leaf IDM CLI node maps to a Container and optionally to a Property if the CLI node is a non-keyword node.

In one embodiment, logical rules implemented in the Build( ) method drive determining whether a Container or Property is represented. A container creation rule and a property creation rule may be implemented. For example, a container creation rule may express the logic shown in Table 3.

TABLE 3

CONTAINER CREATION RULE

A new Container is created for a parser node if:
1. Node's hint (keyword string) = "interface"
2. Leads to a sub-mode.
3. # child nodes > 1

TABLE 3-continued

CONTAINER CREATION RULE 4. if # child node = 1
 a. if # sibling = 1 AND # grand-child > 1
 b. If it lead to a multi-referenced node.
 c. If it is a keyword with both <cr> and <negCr>

A Container can be created both for keyword and non-keyword parser nodes. A Container created from a keyword node that contains a <negCr> tag is a Boolean container since an empty container represents a Boolean value.

As another example, a property creation rule may provide that a Property is created for: a Non-keyword parser node; and a Leaf keyword parser node that has not been used to create a Boolean Container. In an embodiment, when both Container and Property are created for the same parser node, the Property is set as the Value Property of the Container. The new Container will be passed into the recursive Build( ) method to be used as a parent for the IDM node created for the child parser nodes. If no new Container and Property are created, then the collected keyword derived name is passed to all child node processing. Table 4 presents an example of the resulting model structure.

TABLE 4

MODEL STRUCTURE FOR CONTAINER AND PROPERTY

Assume that a "cdp" command is contained in DeviceConfiguration mode.
 "cdp" ( "holdtime" <negCr> <number> <cr, negCr>
  | "timer" <negCr> <number> <cr, negCr> )
| 0 | |M DeviceConfiguration // SEQ_OF_CHOICE |
|---|---|
| |     | ( |
| 1 |     |P k:"CDP" // SEQ_OF_CHOICE |
| |         | ( |
| 2 |         |C- pk:"HoldTime" Integer (10,255) |
| 3 |         |C- pk:"Timer" Integer (5,900 |
| |         | ) |

In the example of Table 4, the "cdp" keyword becomes a Container because it has multiple child nodes. The "holdtime" value does not become a Container because it only has a <negCr> tag and not a <cr> tag. The name "HoldTime" is used in creating the integer property.

The Container Type signifies the position of the Container within the IDM Containment hierarchy. In an embodiment, the following rules are used to identify Container types.

1. ModeContainer is the root container created for a CLI mode.
2. CommandContainer is the first container from the root that has a <negCr>.
3. PrefixContainer is the container between (1) and (2).
4. DataContainer is the container under (2).
5. A special NamingContainer is created to contain naming properties.

Container Order determines the ordering constraints of an IDM XML configuration request. In an embodiment, the following are rules used to identify the Container Order for a given Parser Node and its parent. Since CLI nodes represent Choice order, the general rules are:

1. # of child node=0-> not a Container
2. # of child node >1-> a Choice for Command Container or below, and Sequence-of-Choice for Prefix Container. One exception is Member of a Container that contains Naming Container is a Sequence-of-Choice.

The exceptions to the rules are Sequence and Loop. A Sequence is created generally for a string of non-branching nodes below the Command boundary. Specifically, a node that satisfies the following condition maps to a Sequence:

# of child node=1 and a. The child is a multi-referenced node.

b. The node has both <cr> and <negCR>.

c. # child=1 AND # of sibling >0, check the parent's first child. If parent's first child's child nodes >0, Container is Sequence.

In an embodiment, the Loop attribute is not determined during Container creation, but later when a loop condition is detected when the node is revisited. Loop creation is discussed separately herein.

In an embodiment, a Container name and Property name are determined. In one embodiment, a Container is named according to the logic in Table 5.

TABLE 5

NAMING A CONTAINER

1. For a keyword, use the hint or CLI keyword string. Except for the following:
   If keyword is "interface" use "InterfaceName".
2. If a keyword has neither <cr> nor <negCr> and it is followed by another keyword, keep processing the keyword and concatenate the processed keyword strings. (The keyword must not be multi-referenced.)
3. Use the unused name from parent parser node as prefix.
4. Check and resolve naming conflict within its parent Container. (See Resolving Naming Conflicts subsection.)

According to an embodiment, a Property is named according to the logic of Table 6.

TABLE 6

NAMING A PROPERTY

1. Keyword-derived Boolean Property is named using keyword string.
2. Non-Boolean Property is named as follows:
   If parent parser node has keyword with neither <cr> nor <negCr>, and the keyword has not been used as Container name, then use the parent keyword.
      Construct name from CLI description. (See Deriving Name from Description subsection.)
3. Use the unused name from parent parser node as prefix.
4. Check and resolve naming conflict within its parent Container. (See Resolving Naming Conflicts subsection.)

In one embodiment, a name may be derived from a description. Names derived from CLI keywords do not require extensive processing. However, names derived from description text requires additional rules so that the constructed name is well formed, and can be understood within the context of the Container. In one embodiment, to convert description text into a name, the description text is tokenized into words, and rules are applied to each word. After applying the word rules, additional rules are then applied to create the name.

In one embodiment, the rules for preparing the word tokens are driven by the data shown in Table 7, which can be stored along with a specific IDU to ensure that the naming for that package remains the same given a version of the naming algorithm.

TABLE 7

RULES FOR TOKENIZING WORDS

1. Ignore-able word. Words that are unimportant for naming are excluded, for example, the word "the".
2. Ignore-able last word. This is to specify words that are to be ignored only if they appear at the end.
3. Last word requiring next word. This is to specify words the following word.
4. Known suffix whose first letter must be capitalized. This is to specify common suffix that should be treated like a separate word by capitalizing the first letter. E.g. Number.
5. Character substitution. This is to replace some character such as % into percent.
6. Word substitution. This is for replacing words that mean the same thing with the same word. For example Address for addr.
7. Phrase (multiple words) substitution. This is used to replace a multiple words with a single word, and to ensure that the multiple tokens are included in the name and not counted as separate words.
8. Name Substitution. After the name is constructed using the generic rule, if required it can be replaced with a custom name. To provide additional context, optionally the parser node hint, and the parent parser node hint can also be specified; in this case the name is substituted only if the parser node hints matches as well.

In one embodiment, the algorithm set forth in Table 8 is used.

TABLE 8

PROCESS FOR TOKENIZING WORDS

1. Create a list of words by tokenizing the description. Before tokenizing, erase some known patterns from the string, such as [<][^>]*[>]['][s]
2. Tokenize based on the following separator:
   { }< >( )[ ]-_,^@#!'\'\"$|.?;:\V=" and excluding %, &, +, * which will be replaced with words instead
3. For each word:
   a. Check words to ignore.
   b. Check for phrase substitution (multi-word analysis).
   c. Format the word:
      i. Check word substitution, if found use the substitute.
      ii. Check acronym substitution, if found use the acronym.
      iii. Do character substitution, then capitalize first letter and capitalize first letter of known suffix.
   d. If name is empty, try blank out non alphanumeric characters in the line. (creating one word list.)
4. Make name from word list. Start by using 4 word. If not unique under its parent, try 5, 6, 7 up to 8 tokens. Name must be a valid XML element identifier.
   a. For first word, add "n" if it's number.
   b. For last word:
      i. check if it is last word to be ignored.
      ii. check if it's a last word that require following word.
   c. skip duplicate
   d. skip consecutive numeric tokens. This is for removing phrase that comes from a range such as 10–100.
   e. If the word list is empty, (there are a few non-keyword parser node empty hint) then as the last resort use the parser node name - "Node" + "Param".

Certain embodiments provide for resolving naming conflicts. For example, an IDM Container and Property name must be unique within a parent Container. In most cases, such conflicts are caused by an insufficient number of tokens used in a name that is derived from a text description. In some cases, CLI could result in duplicated Properties derived from separate Parser nodes that are semantically equal. These observations may be used, in one embodiment, in a process summarized in the pseudo-code of Table 9, in which child node processing resolves naming conflicts.

TABLE 9

RESOLVING NAME CONFLICTS

1. Use description to construct name. Start with using 4 tokens or if Candidate Name is already based on description, start with 5 tokens. Repeat up to 8 tokens if necessary, until a unique name is found.
2. If name from (1) is not unique, and the name was originally derived from keyword, concatenate keyword name with description name from (1).
3. If name from (2) is not unique, and there is a preceding Property within the same Container, use preceding Property name as prefix separated with "-" to the candidate-name.
4. As a last resort, if name from (3) is still not unique, add unique number suffix to the name and report duplicate name.

Since the IDM processes described thus far do not understand the semantics of any of the commands, naming conflict resolution does not detect duplicated properties, and may result in semantically common Properties with different names. For example, the Properties MonthYear1, and MonthYear1-DayMonth are semantically same as MonthYear and DayMonth; however, they map to different CLI nodes, and hence result in duplicated names. In this case, the duplicate name MonthYear is resolved by adding "1" as suffix, and the duplicate name DayMonth is resolved by appending the MonthYear1 as prefix.

In one embodiment, a Key Property or Properties (compound key) uniquely identifies a parent Container from sibling Containers. For non-sub-mode commands, assuming that a single negation command will not clear multiple lines of configuration, Key Properties are detected by examining the Properties that precede the first <negCr> tag. For sub-mode commands, the Key Properties are Properties that precede the Sub-mode node. Not all actual Keys can be detected, however; one such exception is a list command.

Figure 12:
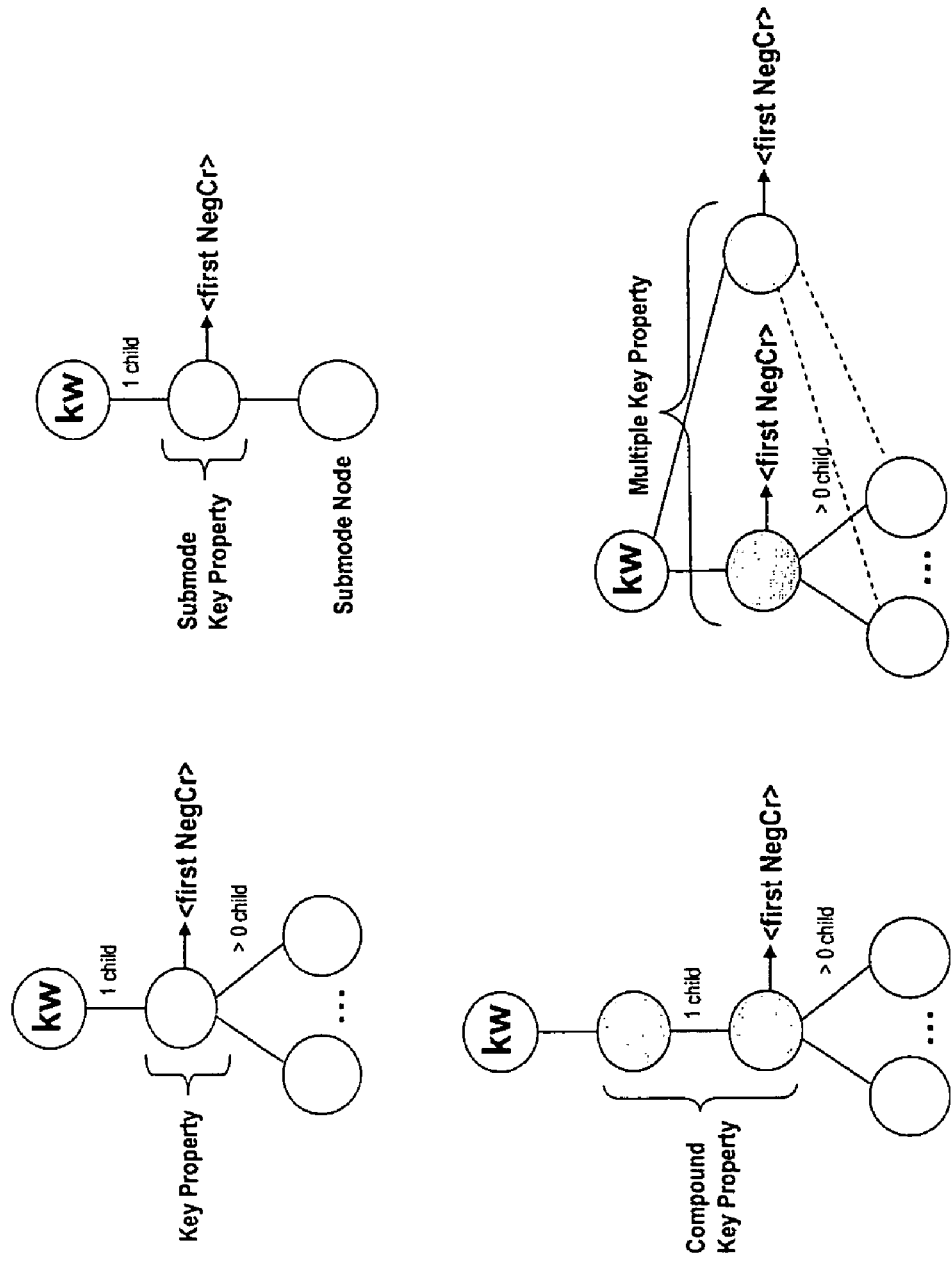
FIG. 12 illustrates four cases in which Naming Properties may be detected.

FIG. 12 illustrates four cases in which Naming Properties may be detected. Key Properties that are identified in the model are grouped and moved into an extra Container named "Naming."

In an embodiment, Property Data Types are derived from the CLI parser node types by stripping the "Node" suffix. Two exceptions are that a KeywordNode translates to Boolean, and a NumberNode translates to Integer. These are the basic Data Types that are exposed in the XSD documents; others may be provided in other embodiments.

In an embodiment, each Container and Property is marked to indicate whether it can be deleted. For example, a Container or Property created from one or more Parser Nodes that are followed by a <negCr> tag accepts "delete" operation in the XML request. The first <negCr> tag from the root that is associated with the CommandContainer corresponds to a delete operation to delete the entire Command Container. An inner <negCr> tag specifies disabling or nullifying only the Data Container or Property.

A Key Properties delete operation is moved to its Naming Container. The Naming Container becomes capable of deletion, and the flag indicating deletion capability is cleared for the Naming Properties inside the Naming Container. Properties within a delete-able Container may also be delete-able consistent with the associated CLI behavior. For example, in the command kw <negCr><int param><negCr>|<cr>, the second <negCr> tag translates to a delete-able Property for nullifying the property.

In an embodiment, a Delete operation is distinct from a Nullify operation. For example, the no keyword before a CLI command causes a device either to delete the entire command, or to nullify a command's parameter. In an embodiment, the "no" keyword translates to the IETF NETCONF protocol delete operation on the XML element to be deleted or nullified. The no for deleting the entire command translates into delete operation in the CommandContainer for singleton command or the NamingContainer of a multi-instance command. The no for nullifying a parameter translates into delete operation on the Property associated with the parameter or on the Container if the no applies to all the parameters in the Container.

A Container and Property with delete can have child XML elements that will be ignored. This approach is consistent with a CLI that allows values in the no command. Further, this approach allows a configuration to be negated by simply apply the no prefix in CLI or the delete operation in XML. For a Property with a numeric value, a dummy numeric value must be supplied for XML correctness.

Container and Property Cardinality values determine the minimum and maximum occurrences of the node under its parent Container. Cardinality values for Containers at the Command level or above, are minOcc=0 and maxOcc=unbounded, since there can be 0 or more command lines in a configuration file. The cardinality values do not specify whether the Command is singleton or multi-instance. A multi-instance Command is specified by its Naming Container. In an embodiment, for Containers and Properties under the Command level, the following logical rules apply:

1. Default min and max occurrences are −1, which implies no specific constraints are explicitly specified. In XML this implies min and max occurrences of 1.

2. If parent parser node has <cr>, then the min occurrence of the Container and Property created for the current parser node is 0. (Optional)

3. If parser node is the same as the node, we have a loop. Mark members of the Loop Container max occurrence=UNBOUNDED.

The following paragraphs address techniques for handling multi-referenced IDM Nodes and Loops. As described above, both the CLI structure and IDM structure defined herein may contain nodes that are referenced from multiple parents. Such multiple referencing occurs below the Command boundary and it is a necessary feature for constructing complex CLI syntax that contains optional tokens, multiple complex options sharing common CLI phrases, or a loop.

In the CLI View, in an embodiment, multi-referenced CLI nodes are directly referenced as Java references from multiple parents. In the IDM View, a multi-referenced IDM node has one parent and optional reference parents. Thus, the structure resembles a logical tree. References from additional nodes are stored as a reference parent list. Additionally, the same multi-referenced child DM node can appear as more than one member within the same IDM node.

In one embodiment, to support multi-referenced CLI nodes, the rules of Table 10 are used in constructing the IDM.

TABLE 10

CONSTRUCTING MULTI-REFERENCED NODES

1. To detect a revisited CLI node (excluding the loop case addressed in (5) below) and to reuse the IDM sub-tree associated with that node, maintain a Visited CLI Node Table that maps CLI node id to its associated IDM node.
2. At the beginning of the visit, place just a Boolean object as a placeholder to indicate that the CLI node has been visited and to prevent looping.
3. At the end of the visit, if a Property is created store the reference to that Property in the Visited CLI Node Table, if no Property is created and a Container is created, store the reference to that Container in the table.
4. When a CLI node is revisited (multi-referenced), check if there is a multi-referenced IDM node associated with that CLI node, and check the multi-referenced IDM node's parent Container.
   a. Check for loop by traversing up the parent path. If the multi-referenced IDM node exists is in the parent path, then the node is in a loop. Do not add the IDM node as a child member, but mark the multi-referenced IDM node as a Loop Container, and set the loopRefId of the current node to the Loop Container id.
   b. If the parent Container is a Choice or Sequence-of-Choice, then add the multi-referenced IDM node as a new child member and add new reference parent.
   c. If the parent Container is a Sequence, then reference all the sequence's child members following and including the multi-referenced IDM node.
   d. While adding a multi-referenced IDM node as a child member, check if the node exists as a member with the same member name (the same node can be present as a proper child and a reference child in the same Container). If there is, add the current IDM node as a reference parent to the IDM node. This reference parent pointer is required for X2C transformation.

An IDM node that references parents will require special handling in the X2C and C2X processing for the correct parent path to be chosen.

A Loop Container is a special case of the multi-referenced IDM node in which the node that is revisited is one of its ancestors. Instead of creating a reference to the ancestor, creating a loop in the IDM structure, the loop referencing the IDM Container (it must be a Container) simply maintains the ID of the multi-referenced IDM node as its loopRefId. A Loop Container does not fit one of the standard Orders: Sequence, Choice or Sequence-of-Choice. In terms of XSD, a Loop is a Sequence-of-Group, with Group max occurrence being unbounded, and where the Group is defined as:

```
Sequence {
  1) One or more optional LoopRef Containers. These Containers can be empty.
  2) One or more non-LoopRef Containers or Properties.
}
```

The following is a simple example that illustrates loop structure. Assume that the CLI supports a command having the form:

filter map <map name>vlan-list (<vlan id>([,|–] <vlan id>)*)+

The IDM associated with this command is shown in Table 11:

TABLE 11

IDM FOR EXAMPLE FILTER MAP COMMAND

<Container ID='529' Name='Filter' MinOcc='1' Order='cpi:sequence' Annotation='Apply a VLAN Map' >
  <Property ID='530' Name='VLANMapName' Type='String' MinOcc='1' Annotation='VLAN map name' />
  <Container ID='531' Name='VlanList' MinOcc='1' Order='cpi:all' Annotation='VLANs to apply filter to' >
    <Container ID='532' Name='VLANId' MinOcc='1' Deleteable='true' Type='command' Loop='true' Order='cpi:all' Annotation='VLAN id' >

TABLE 11-continued

IDM FOR EXAMPLE FILTER MAP COMMAND

<Property ID='533' Name='VLANIdValue' Type='Integer' MinOcc='1' MaxOcc='0' Deleteable='true' Annotation='VLAN id' />
      <Container ID='534' Name='Comma' MinOcc='0' MaxOcc='0' loopRefId='532' Order='cpi:sequence' Annotation='comma'/>
      <Container ID='535' Name='Dash' MinOcc='0' MaxOcc='0' loopRefId='532' Order='cpi:sequence' Annotation='hyphen' />
    </Container>
    <Property ID='536' Name='All' Type='Boolean' MinOcc='1' Deleteable='true' Annotation='Remove this filter from all VLANs' />
  </Container>
</Container>

As another example, Table 12 presents XML text for a command of the form: filter map6 vlan-list 6, 7, 9-10.

TABLE 12

EXAMPLE XML FOR FILTER COMMAND

<Filter>
  <VLANMapName>map6</VLANMapName>
  <VlanList>
    <VLANId>
      <VLANIdValue>6</VLANIdValue>
      <Comma/>
      <VLANIdValue >7</VLANIdValue>
      <Comma/>
      <VLANIdValue>9</VLANIdValue>
      <Dash/>
      <VLANIdValue>10</VLANIdValue>
    </VLANId>
  </VlanList>
</Filter>

In a more complex loop, the Loop Referencing Container may not be a direct child of the Loop Container but contained under one or more hierarchy of Containers.

The Loop Property is a Property that has a maximum occurrences (maxOcc) value of "unbounded," and associated with a CLI parser node that references itself.

Optionally, in one embodiment, certain model simplifications may be performed. In one embodiment, an enumeration simplification is performed either during or after model construction. Enumeration post-processing converts a Choice Container of Boolean Properties into an enumeration. Boolean Properties that are reverted back to its numeration are renamed with their original CLI keyword values.

In another embodiment, simplification involves not handling certain command patterns. For example, as noted above, an IDM Sequence cannot contain another Container. Therefore, although the following three patterns can be detected, they cannot be used, as it would require custom naming rule that is inconsistent with the IDM naming:

$A(BC+C)=A\ [B]\ C$ $A(B+CB)=A\ [C]\ B$ $A(B\ C+D\ C)=A\ [B+D]\ C$

3.5 Transformation from CLI to XML Format

Referring again to FIG. 1B, in an embodiment, a C2X module (4) transforms one or more CLI commands 138 from a network device into XML data 136 for use in an XML response or notification, such as a response or notification that is compatible with the NETCONF protocol. In an embodiment, the C2X module (4) performs a transformation using the mapping information in the IDM View (2) that is produced by the IdmBuilder (1) during model generation. According to an embodiment, the C2X module (4) implements the algorithm set forth in Table 13.

TABLE 13

CLI TO XML TRANSFORMATION

1. Parse and verify syntax of all CLI lines. This provides CLI View names and the parser nodes for the CLI lines.
2. For each CLI line and each CLI parse node in the line, find the associated IDM node.

TABLE 13-continued

CLI TO XML TRANSFORMATION

3. Walk up the IDM node to construct a path to the IDM node from the root.
4. Construct the associated IdmDataNode list for the IDM node path from (3). This represents an XML path for that CLI parse node.
5. Repeat (2) for all the parse nodes of the CLI line and combine the XML path with the previously constructed XML path.
6. While we are walking down the CLI path maintain a table mapping IDM node and its reference parent constructed by checking if the previous Container is a reference parent of the current IDM node.
7. Use the table constructed in (6) while walking up the IDM structure in (3) to choose the reference parent to traverse up.
8. Since the same IDM node can exist as multiple members of the same of IDM parent node - with different member name, the member name must be recorded. This member name will be used for the element tag instead of the node name.

Figure 13A:
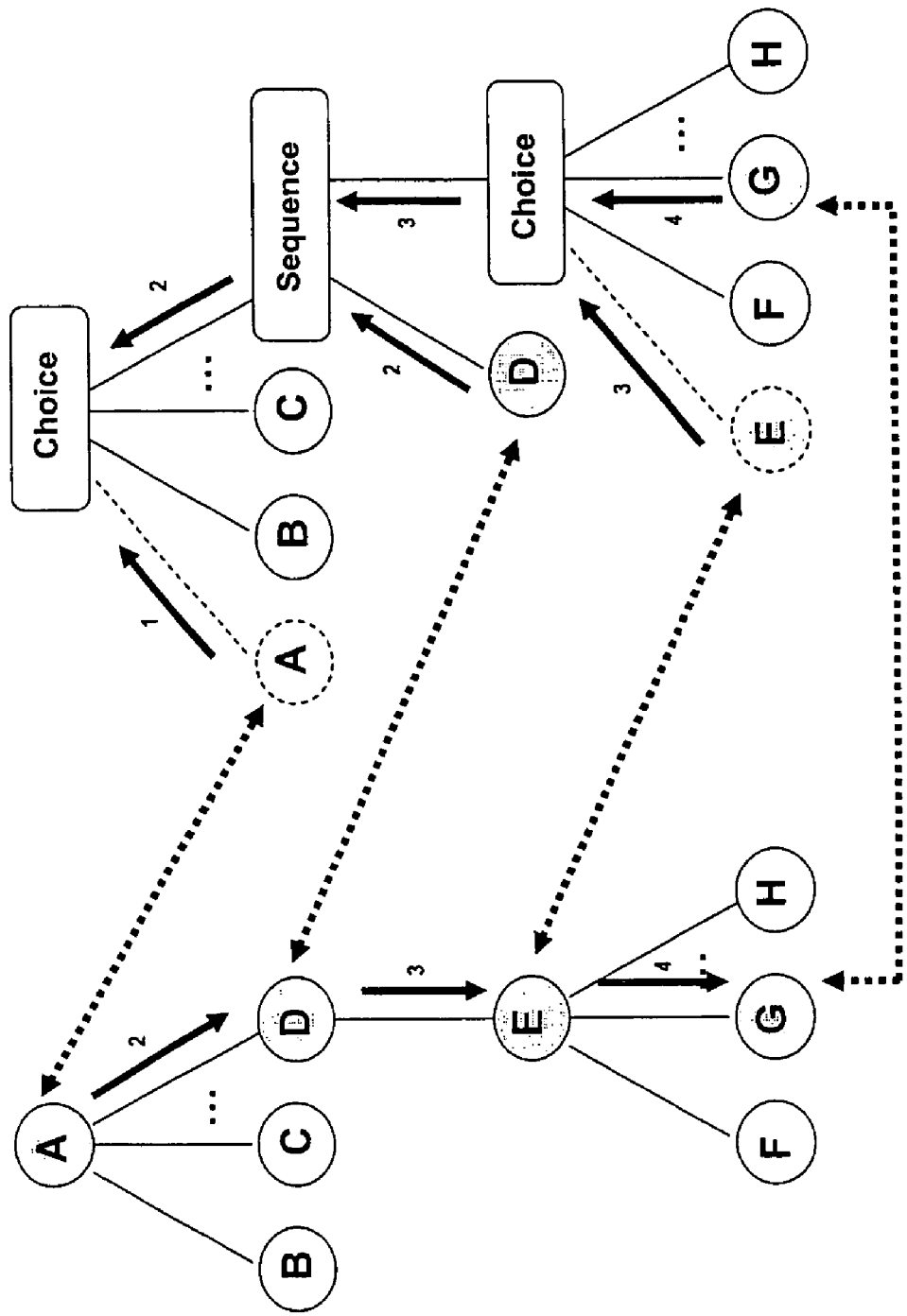
FIG. 13A illustrates CLI to XML transformation for an example set of nodes A to H, inclusive.

In Table 13, steps 6 to 8 determine which parent to traverse up to in step (3), while handling any multi-referenced IDM Node. FIG. 13A illustrates the C2X transformation for an example set of nodes A to H, inclusive. If a parsing error arises when the CLI commands are parsed at step 1, in an embodiment, the device configuration commands that fail parsing are not dropped. In addition to reporting errors, the CLIs that fail parsing are in the generated XML document, delimited by a cmd tag.

Referring again to FIG. 1B, in an embodiment, an X2C Transformation module (3) receives transforms XML data 136, such as data from a NETCONF XML request, into CLI for a target device. The X2C Transform process is performed using the mapping information in the IDM View (2) that is produced by the IdmBuilder module (1) during model generation. According to an embodiment, the X2C Transform process uses the algorithm of Table 14:

TABLE 14

XML TO CLI TRANSFORMATION

1. Parse request using XML DOM parser to produce DOM tree.
2. Walk the DOM tree and find a corresponding entry in the IDM View, and create IdmDataNode tree which represents the XML request. This step also serves as a validator for the XML request.
3. Walk the IdmDataNode tree in the request down to leaf IDM nodes.
4. As each leaf IDM node is visited, find the corresponding parser node in the CLI View, then traverse up the CLI parser graph and build a CLI path for that particular leaf IDM node.
5. Repeat (4) for other leaf IDM nodes and as we traverse up connect it up to the CLI path from the previous IDM node.
6. When all the nodes in the IdmDataNode tree is completely traverse, create the CLI string expression from the CLI path using the CLI keywords and parameter values.
7. Create a table to store the selected parent CLI node id for multi-referenced CLI node id. Initialize the table at the top of IdmDataNode tree and populate it on the way down to each leaf IDM node. Thus the mapping is valid only for that leaf IDM node.
8. In looking up the CLI command id for a given IDM node id, for a ValueChoice Container check also:
   a. If CLI command id is null, the mapping is in the Value Property.
   b. If the first child is the Value Property, lookup the CLI node id based on the Value Property.
   c. If the first child is a Naming Container, the Value Property should be the first child of the Naming Container.
9. For a Container with Value Property, lookup the command id from the Value Property. (The mapping information is stored against the Value Property, not the container.)
10. For a Choice or Sequence-of-Choice, or for Container that contains only one member, simply use the CLI node associated with its parent Container or in some cases its Grandparent Container if there is no CLI node mapping for the parent Container.

TABLE 14-continued

XML TO CLI TRANSFORMATION

11. For a Sequence if the child node has a reference parent:
    a. If there is last leaf IDM node's CLI node id from processing a preceding child node, then use that last leaf IDM node's CLI node id as the parent.
    b. Otherwise, use the Container command id as its parent.
12. For Loop Container:
    a. If there is last leaf IDM node's CLI node id from processing a preceding child node, then use that last leaf IDM node's CLI node id as the parent.
13. For Loop Referencing Container
    a. If there is last leaf IDM node's CLI node id from processing a preceding child node, specify the last leaf IDM node's CLI node id as the parent of the Loop Container's command id. (The Loop Container id is identified by loopRefId.)
14. As we traverse up the CLI parser graph in (4) above, use the table constructed in (7) to determine which parent to traverse up.

Figure 13B:
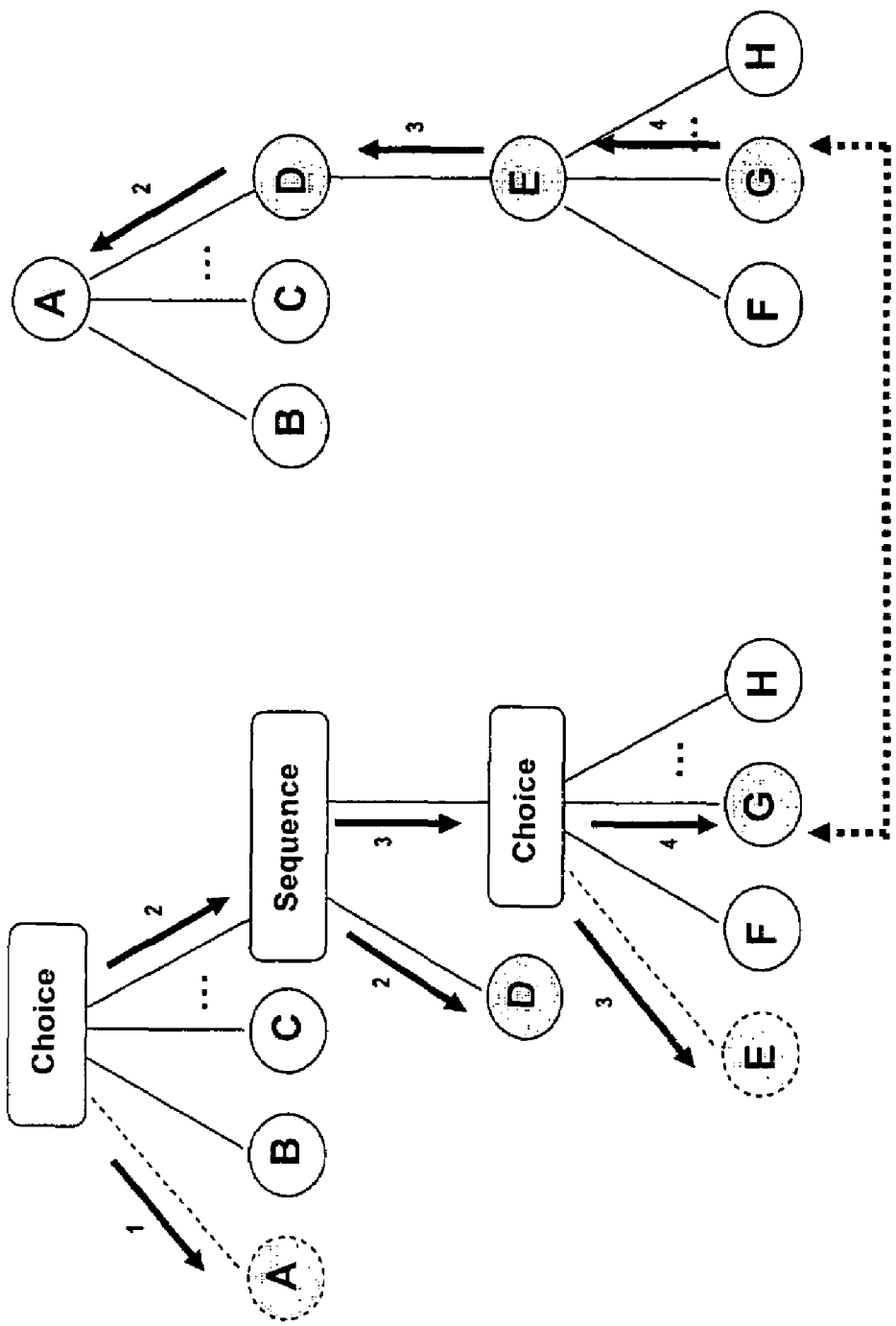
FIG. 13B illustrates XML to CLI transformation for the nodes shown in the example of FIG. 13A.

Step (7) is used to determine which parent to chose in traversing up the CLI View parser graph in step (4) above, taking into account any multi-referenced IDM Node. FIG. 13B illustrates X2C transformation.

In the foregoing approaches, CLI commands can be embedded inside XML configuration statements wrapped inside the cmd tag. One use of this approach is to support transformation of CLI that is not known to the E-DI CLI parser at the time that transformation is performed.

3.6 Transformation Error Handling

In one embodiment, when the C2X Transform module (4) of FIG. 1B is used to transform CLI to XML, errors may be reported by the E-DI CLI Parser as it performs a syntax check of the CLI. A list of command lines that failed CLI parsing is reported. In another embodiment, CLI commands or lines that failed a syntax check may be embedded in a CLI tag. In another embodiment, in the X2C Transform module (3) of FIG. 1B, the location of errors is reported as the String Path of the element in error.

In either embodiment, E-DI run-time 130 provides the following error processing options: Stop, Ignore, or Skip. Stop means to stop processing when an error is encountered. Ignore, which is applicable only to X2C, means to ignore the error and generate output for the element in error. Skip means to skip to the next valid input and do not produce invalid output.

3.7 Example Interface Design

Figure 14:
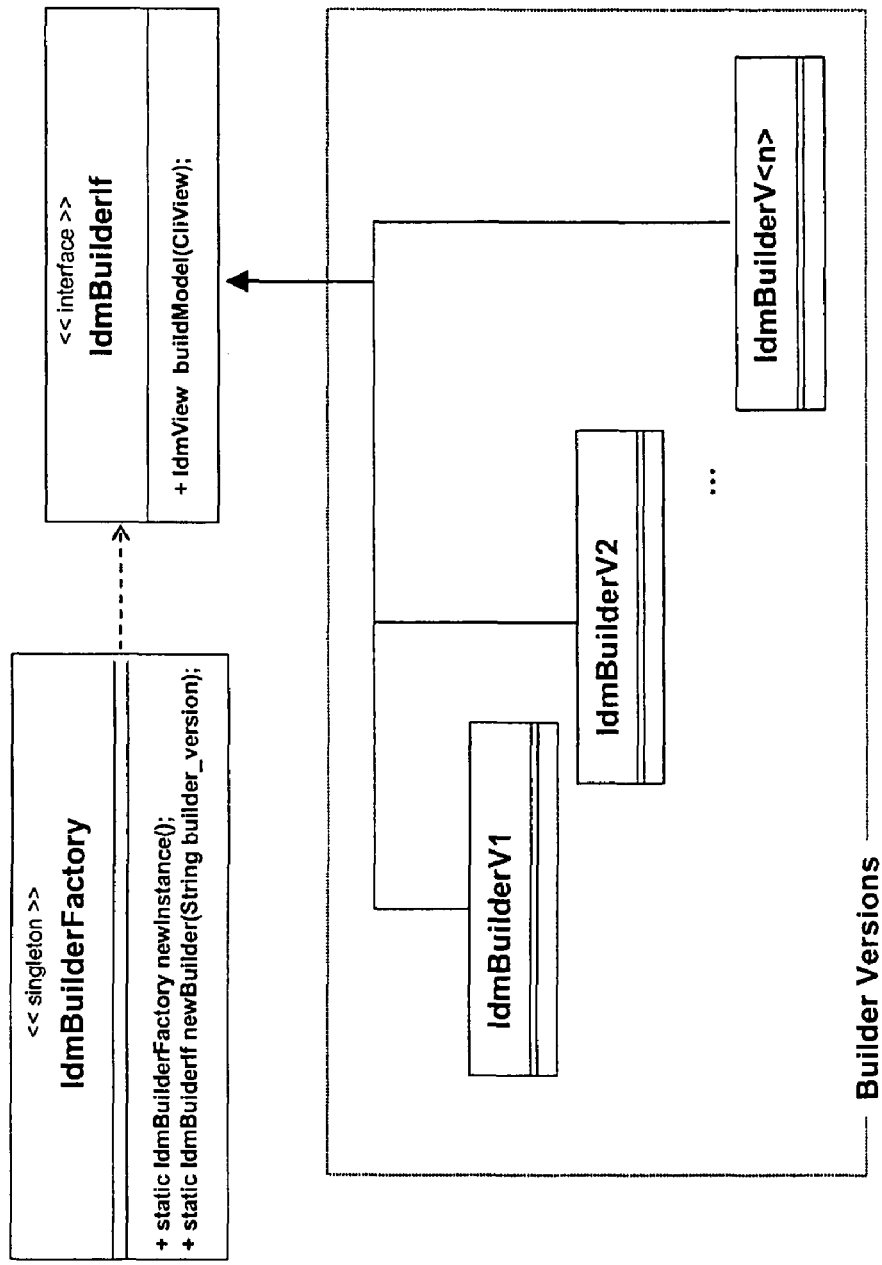
FIG. 14 illustrates example main classes that may be used to implement an intermediate model builder program.

An example interface design is shown in FIG. 14, which illustrates the main classes associated with IdmBuilder. In an embodiment, to allow versioning, client code does not instantiate the IdmBuilder class directly, but performs instantiation through the IdmBuilderFactory class. Which IdmBuilder to instantiate is determined based on the namespace in an XML request.

4.0 Creating a Command Knowledge Base

In one embodiment, a method and system for automatically determining commands for a network element are implemented using an auto-learning software framework that learns commands that particular network devices support in an automated manner, and builds a command knowledge base. A network management system or station (NMS) can use the knowledge base to provide management for a large number of different types of devices quickly and efficiently. The disclosed approach is less error-prone compared to manual entry or coding of device commands.

Figure 17:
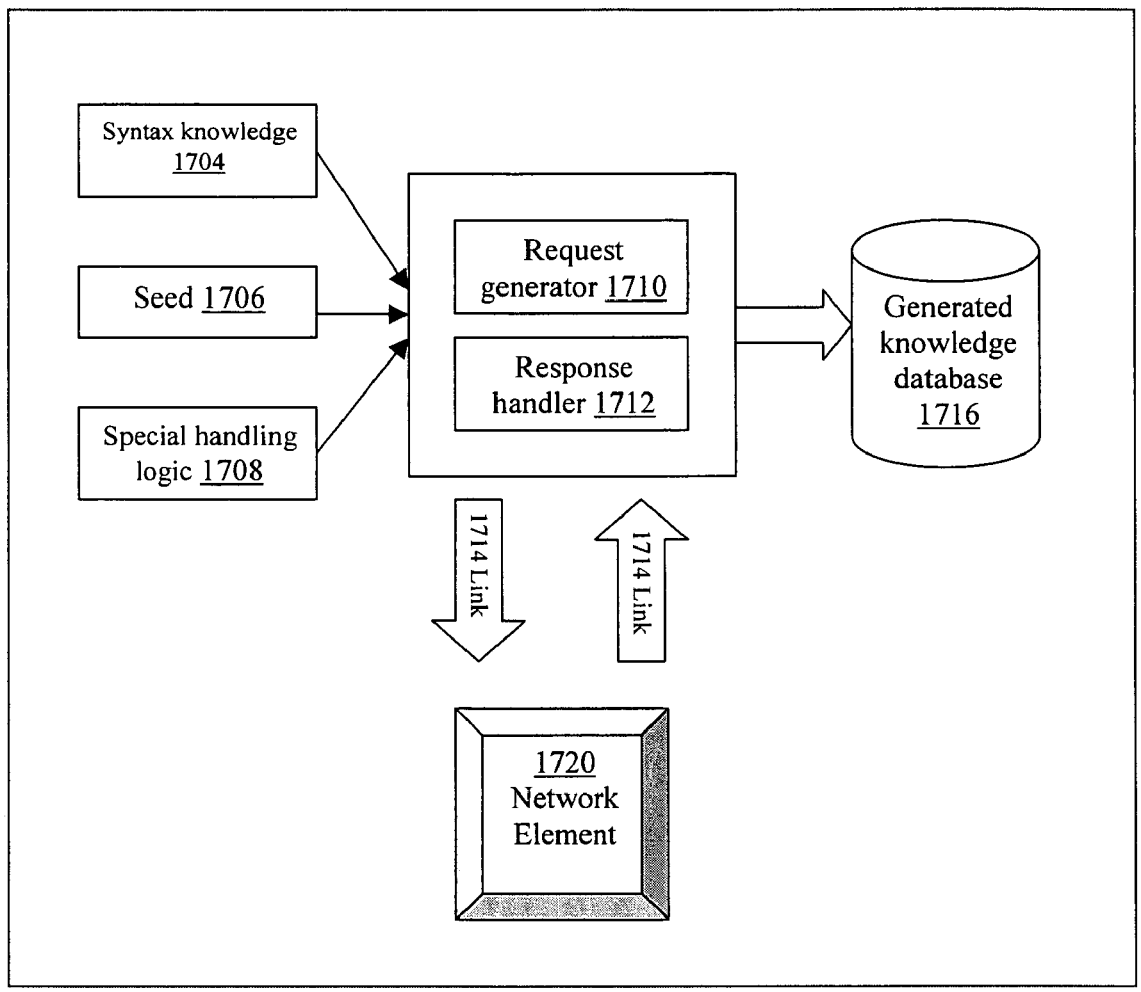
FIG. 17 is a block diagram of an auto-learner framework according to some embodiments.
Figure 18A:
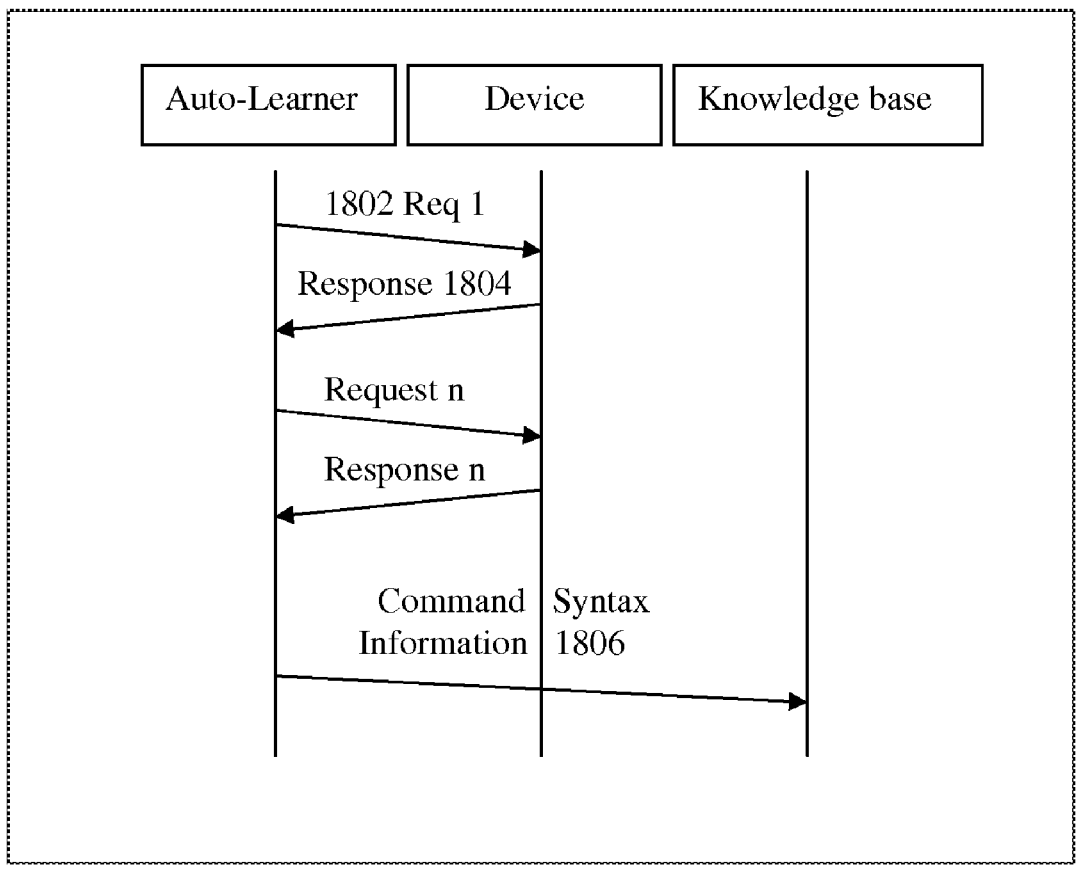
FIG. 18A is a block diagram of an auto-learning process.
Figure 18B:
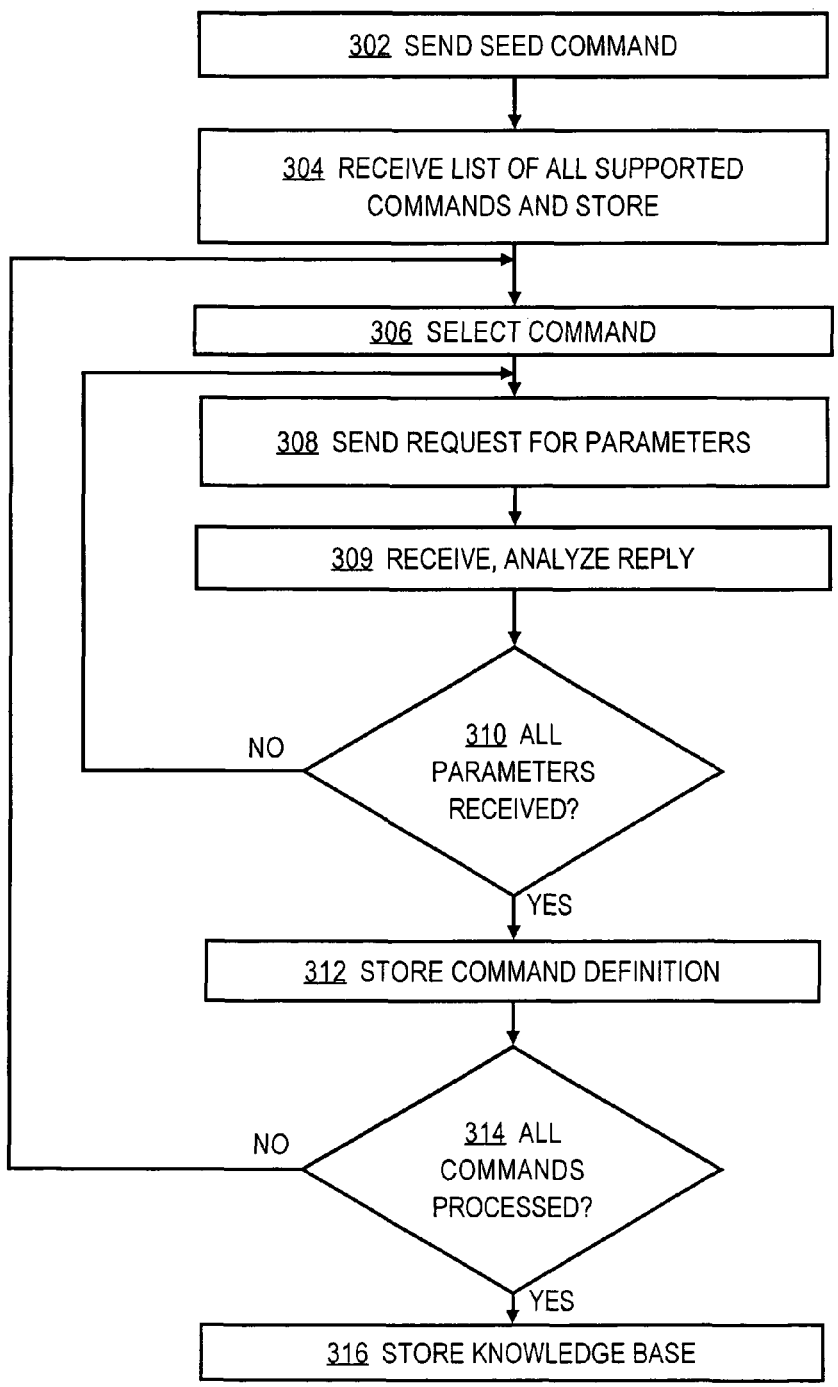
FIG. 18B is a flow diagram of an auto-learning process.

An example embodiment is now described with reference to FIG. 17, FIG. 18A, FIG. 18B, and FIG. 19. FIG. 17 is a block diagram of an auto-learner framework according to some embodiments; FIG. 18A is a ladder diagram of an auto-learning process; FIG. 18B is a flow diagram of an auto-learning process; and FIG. 19 is an example command knowledge base in XML format.

4.1 Structural Overview

Referring now to FIG. 17, according to one embodiment, an auto-learner framework 1702 comprises device command syntax knowledge 1704, a seed command 1706, special case handling logic 1708, a request generator 1710, and a response handler 1712. An embodiment may implement framework 1702 in one or more computer programs or other software elements, firmware, or any combination thereof. Framework 1702 is coupled to or includes a knowledge base 1716, which provides a repository for storing information that defines commands that a network element 1720 supports. Framework 1702 is coupled, directly or indirectly through one or more networks, to network element 1720.

In an embodiment, before interacting with network element 1720, framework 1702 has information identifying a type of network element 1720, and syntax knowledge 1704 defining a general command syntax used by the network element. However, framework 1702 does not have information specifying the complete command set that the network element 1720 supports. Further, framework 1702 does not have information indicating whether the command set of the network element 1720 has changed recently.

Network element 1720 may comprise any network end station or infrastructure element that supports a command language for configuration or management, such as a router, switch, wireless access point, firewall, etc. Thus, the techniques herein apply broadly to any network end station or infrastructure element that supports such a command language for any purpose. Further, in this description, the term "device" refers broadly to any network end station or infrastructure element.

In an embodiment, auto-learner framework 1702 assumes that commands that a device supports conform to a certain syntax. Information defining the general syntax used for a device is stored in device command syntax knowledge 1704. For example, device command syntax knowledge 1704 defines what data types or classes of values can be used as parameters for particular commands. The syntax knowledge also defines command contexts, if a particular device implements command contexts. For example, certain commands cause a network element to enter a different context, and subsequent commands issued in one context will produce a different result than if the same commands are issued in a different context. The syntax knowledge 1704 further defines what part of a response indicates that a command definition is complete. The use of information contained in syntax knowledge 1704 is clarified in the description below.

The seed command 1706 defines a particular device command which, when sent to network element 1720, will cause network element to reply with a list of supported commands.

Special case handling logic 1708 provides program code or other software elements for handling exceptions to the general rules that are defined in syntax knowledge 1704. Such exceptions may be the same for all devices in a family of devices, or may apply only to the functionality or feature that is being learned at a particular time.

Request generator 1710 forms and sends commands or information requests to network element 1720. Response handler 1712 processes replies that are received from the network element 1720 and creates data for storage in the knowledge base 1716.

4.2 Functional Overview

Referring now to FIG. 18A, in one embodiment, the techniques herein use active interaction with a device to learn device commands. In one approach, a command expressing a request is sent to the device, as indicated by arrow 1802. At arrow 1804, a response is received from the device, the response is analyzed, and information defining a learned command is stored based on the response. Further requests are sent to get more information on the command if the received response does not represent a complete definition of the command or if the response is insufficient to build complete knowledge of a command. The preceding process is repeated until all the supported commands are learned. Command syntax information is stored in a device command knowledge base is built, as shown by arrow 1806.

FIG. 18B illustrates an example process in more detail. For purposes of illustrating a clear example, FIG. 18B is described in the context of the system of FIG. 17. However, other embodiments of the techniques of FIG. 18B may be implemented in the context of other systems.

In step 1802, a seed command is sent. For example, autolearner framework 1702 sends seed command 1706 to network element 1720. In step 1804, a list of all supported commands for the device is received and stored. For example, network element 1720 responds with information defining all commands that it supports. In one embodiment, the seed command 1706 is a "help" or "?" command, and in response, the network element provides a list of all commands that are allowed in the then-current context of the network element. Routers, switches, and other network devices from Cisco Systems, Inc., San Jose, Calif., support seed commands of the type just described.

At step 1806, the process selects one command in the received list for further processing. Step 1806 represents the start of a loop that ends at step 1814 and includes steps 1808, 1810, 1812 for determining what parameters the network element requires, uses or defines as part of the selected command. For example, at step 1808, the process sends a request for parameters for the selected command. At step 1810, the process determines if all parameters for the request have been received, based on receiving and analyzing a response from the network element, as shown by step 1809.

If not all the parameters were received for the selected command, then control returns to step 1808 and further parameter requests are sent. If all parameters have been received, then at step 1812, information defining the selected command is stored.

For example, assume that the network element 1720 supports a command named "cmd1" that requires two parameter values to be set, and that the required syntax is "cmd1 parameter1 value1 parameter2 value2." In one case, step 1808 involves sending the request "help cmd1," and in response, the network element provides a complete listing of parameters and values. In another case, step 1808 involves sending an incomplete command and the network element responds by providing a complete listing of parameters and values.

In yet another case, step 1808 involves sending an incomplete command, and a response from the network element indicates only the next parameter that the command syntax requires. For example, sending a request of the form "cmd1 parameter1" causes the network element to respond indicating that it needs a value of type X. The particular one of the foregoing cases applicable to a particular type of network element may vary according to the vendor of the network element, the operating system, or other factors. The particular one of the foregoing cases applicable to a particular type of network element may be defined, in one embodiment, in syntax knowledge 1704.

Requests sent at step 1808 might require a literal value for a parameter in order to enable the process of FIG. 18B to determine the next valid parameter for a command. In one embodiment, step 1808 involves forming a command that includes valid sample values for any parameters that require specifying a value as a condition to learn the next parameter. For example, to induce a response that defines additional parameters for a command relating to setting parameters on a fast Ethernet interface of a wireless access point, the command must include a valid IP address for the interface. In this example, step 1808 involves generating a sample Ethernet interface address to include in the command.

Some commands that some network elements support may allow an unlimited number of parameters and values. Therefore, the approach of FIG. 18B is provided with a mechanism to prevent endless loops. For example, assume that at step 1808 and step 1809 the following command example and reply are sent and processed, respectively:

issc-gw#show ip bgp community ?

| | |
|---|---|
| <1-4294967295> | community number |
| exact-match | Exact match of the communities |
| local-AS | Do not send outside local AS (well-known community) |
| no-advertise | Do not advertise to any peer (well-known community) |
| no-export | Do not export to next AS (well-known community) |
| \| | Output modifiers |
| <cr> | |

Assume further that after analysis at step 1809, the process next sends the command and reply as follows:

| | |
|---|---|
| <1-4294967295> | community number |
| exact-match | Exact match of the communities |
| local-AS | Do not send outside local AS (well-known community) |
| no-advertise | Do not advertise to any peer (well-known community) |
| no-export | Do not export to next AS (well-known community) |
| \| | Output modifiers |
| <cr> | |

In this case, the same set of parameters and descriptions has been provided by the network element in responses for both commands identifying the "community" node and "<1-4294967295>" node. The second request included "123" as a sample node identifier value and received the same result as when the first request included "community" as a node identifier. Therefore, sending further commands that specify additional nodes will not yield additional useful information, and an unlimited list of parameter values is allowed. Therefore, the process detects an endless loop and discontinues requesting parameters for the current command.

In an embodiment, the presence of a recursive command that will cause an endless loop is detected as follows. First, the process compares the help command result, which is a list of parameter hints and descriptions, for the current node's parent with the current node's help results. In this context, "node" refers to a data structure in the knowledge base that defines and is associated with a command. If the result information is the same for both nodes, then the process of FIG. 18B considers an unlimited parameter list to exist, and this is represented in the command knowledge base.

At step 1814, a test is performed to determine if all commands have been processed. If so, then at step 1816, the command knowledge base 1716 is created. The command knowledge base 1716 may be structured according to any convenient text or binary format.

In one embodiment, the command knowledge base is stored in Extensible Markup Language (XML) format according to the example schema shown in FIG. 19. In operation, an NMS can receive, parse, and use such a command knowledge base.

Using the preceding general process, based on basic command syntax knowledge, an auto-learner framework generates a series of requests and analyzes responses from a network element until all commands are completely learned.

4.3 Context Processing

Certain network elements and operating systems support multiple command views or contexts. For example, when a particular command is executed, the view or context changes, and subsequent commands have different meaning or cause different results than if the same commands were executed in the prior context. The new view or context typically contains different commands than the commands allowed in the preceding view or context. Further, the same commands may require different parameters in a different context or view.

In one embodiment, analyzing a response at step 1809 of FIG. 18B further involves identifying whether a context change has occurred. If a context change occurs, then the process of FIG. 18B is recursively invoked to capture all commands and parameters for the new context or view.

In one embodiment, detecting a context change involves detecting when a response from a network element uses a different prompt string. In other embodiments, detecting a context change may involve detecting other information in a response from a network element. The syntax knowledge 1704 may define, for each supported network device or device type, what information in a response from a network element indicates a context change.

Additionally or alternatively, a change in context or view is identified by comparing a list of commands in a current view to a parent view. If any change in context or view occurs, the process creates a new view in the knowledge base 1716 and changes the current view to the newly created view.

4.4 Syntax Knowledge Example

In one embodiment, syntax knowledge 1704 comprises:

1. Information defining how to generate a sequence of related requests to cause a network element to reply with a complete command definition. For example, such information may specify how to use "help" commands, or the equivalent, to cause the network element to provide information that defines commands.

2. Information defining how to interpret a response from a network element to determine: if the command is complete; if the command is incomplete and still needs some more parameters, or is incorrect; if the command is invalid; the type of valid values that the network element expects for parameters; whether a parameter is mandatory; and the correct execution context for the command.

For example, syntax knowledge 1704 for a particular type of network device may comprise the following:

1. The command "?" causes the device to reply with a list of valid commands for the current view or context, including command name and description. An example of output in response to a "?" command is:

show show command
dir list contents of a directory
copy copy a file

2. Sending a valid command followed by the character "?" causes the device to reply with a specification of the next parameter for the command. Example commands and reply output is:

"copy ?" generates a reply of: "TOKEN specifies source file"

"copy srcfile ?" generates a reply of: "TOKEN specifies destination file"

"copy srcfile dstfile ?" generates a reply of "NOMORE" or "<CR>" (carriage return character).

3. Sending an invalid command causes the device to generate a response containing the string "Invalid command."

4. Sending an incomplete command causes the device to generate a response containing the string "Incomplete command."

5. When the string "TOKEN" appears in a response, text input is required at the position indicated by TOKEN.

6. When a response includes values of the form "A.B.C.D", an Internet Protocol (IP) address is required in a valid, complete command at the position indicated by "A.B.C.D."

7. "NOMORE" or "<CR>" (carriage return character) indicates that no other parameters are allowed or required.

For devices from Cisco Systems, Inc., the following values of TOKEN are stored in syntax knowledge 1704 and recognized in commands: IPADDRESS; IPV6ADDRESS; IPADDRESSMASK; MASK; WORD; LINE; FILENAME; HOSTNAME; MACADDRESS; CHAR; LOWCHAR; MONTH; DAY; SIMPLETIME; COMMUNITY; VPN-COMMUNITY; TIME; DELAY; METRIC; HEXDESCR; HEXDATA; HEXSTRING; HEXNUM; APPLETALKIP; NOVELLEIGRPIP; VINES; APOLLO. In other embodiments, syntax knowledge 1704 may identify different recognized keywords or token values.

5.0 Programmable Network Intelligence System

Figure 20:
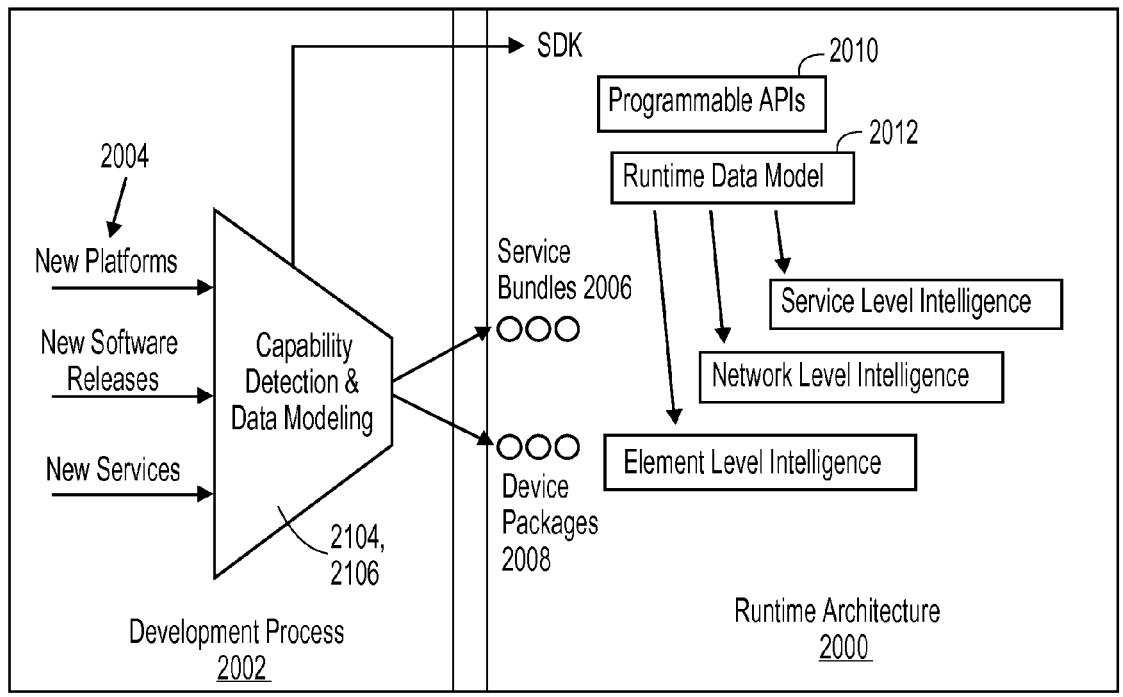
FIG. 20 is an illustration of Programmable Network Intelligence architecture.
Figure 21:
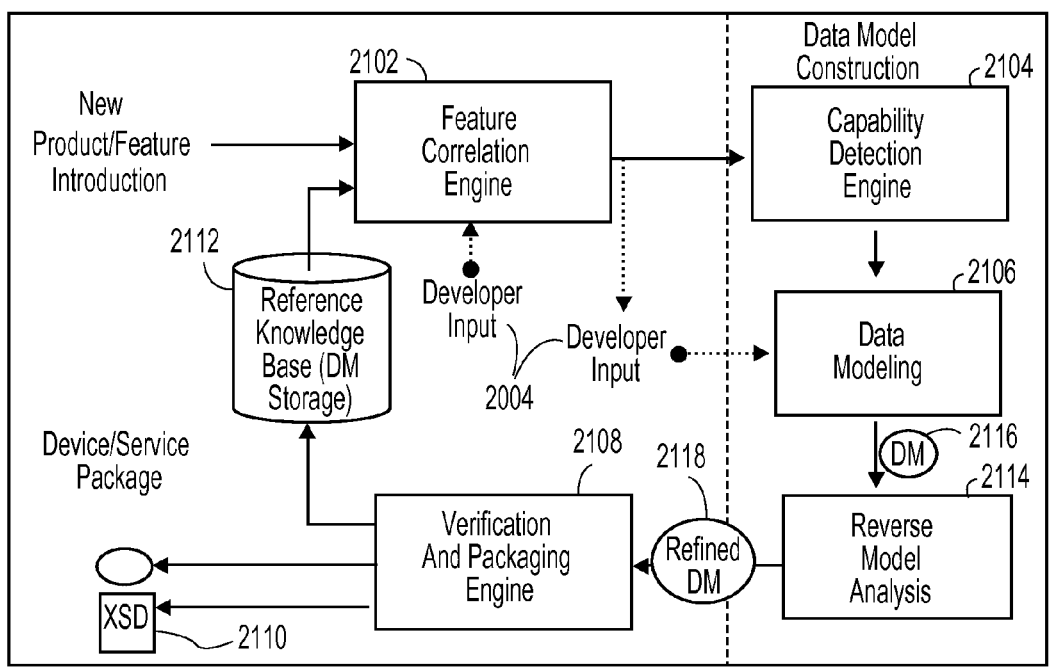
FIG. 21 is a block diagram generating Programmable interfaces.

The programmable network intelligence approaches presented in this disclosure define apparatus, methods, mechanisms and tools to generate components required for providing programmable APIs to a device or group of devices or a network. The approaches are described herein with reference to FIG. 20 and FIG. 21. FIG. 20 is an illustration of Programmable Network Intelligence architecture. FIG. 21 is a block diagram of a method and apparatus for generating Programmable interfaces.

Referring first to FIG. 21, the following components are defined. A Feature Correlation Engine 2102 contains a correlation matrix of features supported by different devices and different operating system versions. A Capability Detection Engine 2104 uses the feature correlation matrix to generate device capability and command knowledge. The Capability Detection Engine 2104 builds a device capability and command knowledge base 2112. The database contains information defining device capabilities, device command intelligence such as command syntax, parameter constraints and command views.

A Data Modeling Engine 2106 builds data models from the device knowledge base 2112. In one embodiment, Data Modeling Engine 2106 generates Data Model (DM) files 2116 in XML format. Elements of the run-time environment (FIG. 20) use the DM files to transform XML requests to device native commands and vice versa. The techniques of Section 3.0 hereof may be used to generate the DM files using a predictive approach described above.

A Verification and Packaging Engine 2108 verifies the accuracy of the data model represented by a DM. The Verification and Packaging Engine 2108 also builds XML schemas based on the data model represented by the DM file. The XML schemas, represented by XSD 2110, are published to users so that users can generate valid requests from applications or environments and to interpret the responses.

In one embodiment, one or more Reverse Model Analyses 2114 receive DM files 2116 and apply analysis to determine if the data model accurately reflects device commands. As a result, a refined DM 2118 is produced and provided to the Verification and Packaging Engine 2108.

A Runtime Environment 2000 provides runtime support for program execution.

Referring now to FIG. 20, in one embodiment, creating programmable network intelligence begins in a development process 2002 and results in creating the runtime environment 2000. Developer input 2004 such as information defining new hardware-software platforms, new software releases, and new services are received at capability detection engine 2104 and data modeling engine 2106. The capability detection engine 2104 and data modeling engine 2106 generate a runtime environment or architecture 2000 for one or more devices that provides service bundles 2006 and device packages 2008. The service bundles 2006 encapsulate service level intelligence. The device packages 2008 encapsulate element level intelligence.

The capability detection engine 2104 and data modeling engine 2106 also generate a software development kit (SDK) comprising one or more programmable APIs 2010 and a runtime data model 2012. External applications can manage devices by calling routines of the APIs 2010 with data or commands that conform to the runtime data model 2012.

In one embodiment, an API for a device is generated by walking a tree representation in the data model and automatically generating stub code containing command invocation methods that have method names matching a command name, and method parameters matching names and data types of command parameters found in the data model. The APIs reflect a combination of requests defined by the IETF NETCONF standard and XSDs that are generated based on the data model. The NETCONF standard defines different types of requests to edit, create, delete or retrieve configuration from devices. The XSDs define the actual legal content of these requests for particular devices. The XSDs are generated using the data model.

In essence, based on the feature correlation matrix and other developer input, and based upon detecting what commands and a parameters are correct for a particular target network device type, the approaches herein can automatically generate an abstract data model representing the features and commands of the device, and generate one or more programmable APIs that applications can use to manage the device and access features or commands of the device. As a result, applications gain programmatic access to devices that do not provide a native network management interface.

6.0 Implementation Mechanisms—Hardware Overview

Figure 15:
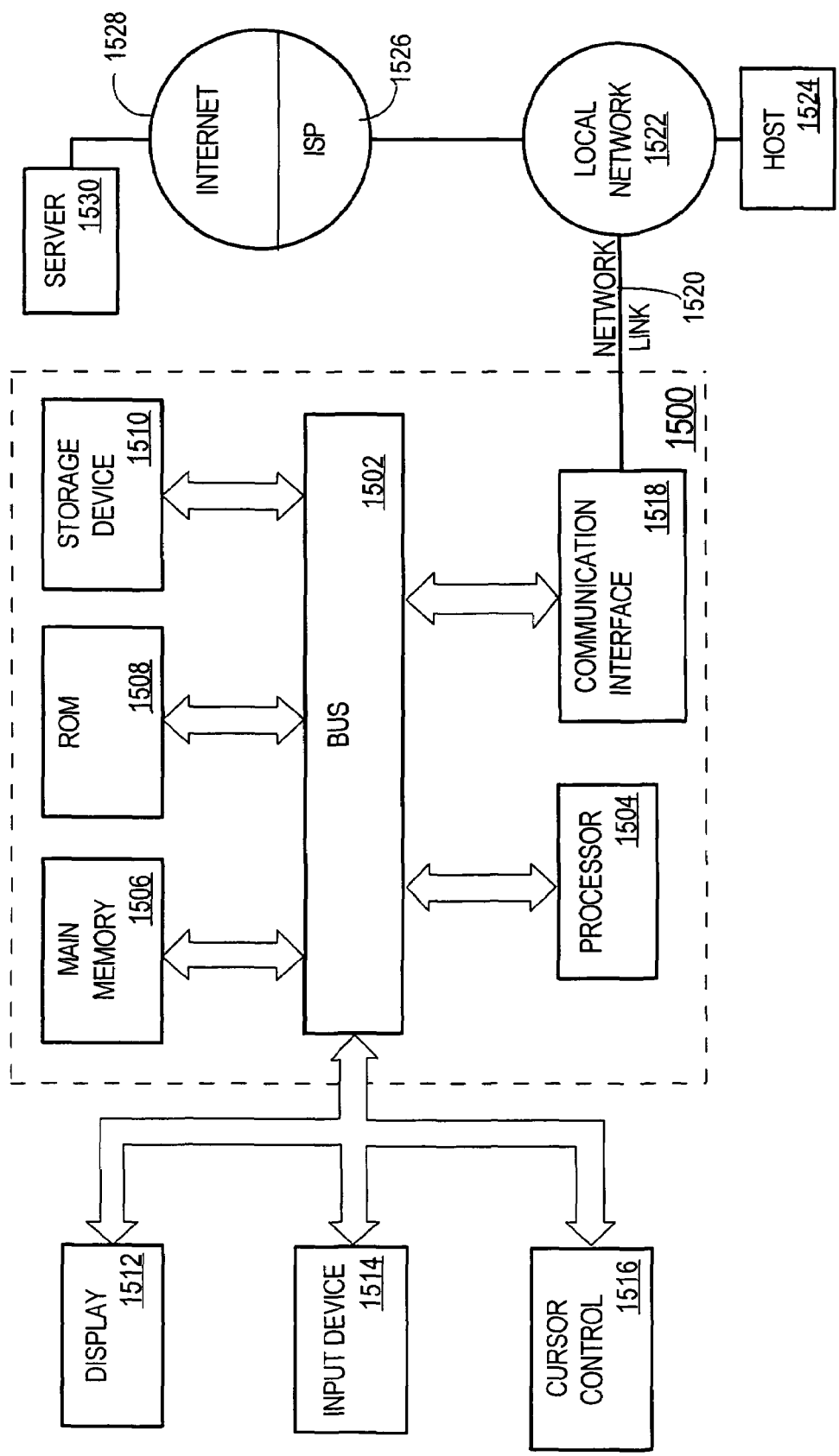
FIG. 15 is a block diagram that illustrates a computer system upon which an embodiment may be implemented.
Figure 16:
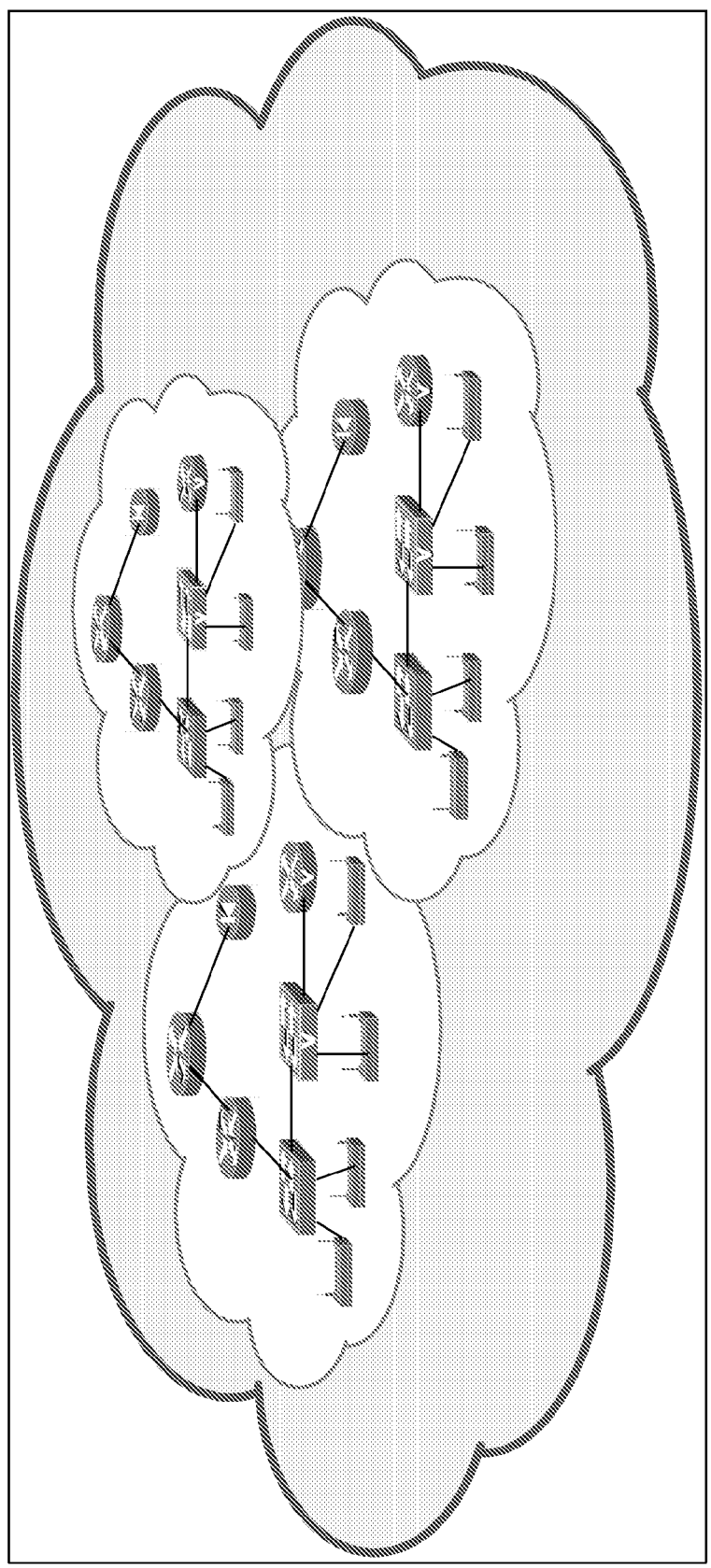
FIG. 16 is a block diagram of a typical network arrangement in which an embodiment may be implemented.

FIG. 15 is a block diagram that illustrates a computer system 1500 upon which an embodiment of the invention may be implemented. Computer system 1500 includes a bus 1502 or other communication mechanism for communicating information, and a processor 1504 coupled with bus 1502 for processing information. Computer system 1500 also includes a main memory 1506, such as a random access memory ("RAM") or other dynamic storage device, coupled to bus 1502 for storing information and instructions to be executed by processor 1504. Main memory 1506 also may be used for storing temporary variables or other intermediate information during execution of instructions to be executed by processor 1504. Computer system 1500 further includes a read only memory ("ROM") 1508 or other static storage device coupled to bus 1502 for storing static information and instructions for processor 1504. A storage device 1510, such as a magnetic disk or optical disk, is provided and coupled to bus 1502 for storing information and instructions.

Computer system 1500 may be coupled via bus 1502 to a display 1512, such as a cathode ray tube ("CRT"), for displaying information to a computer user. An input device 1514, including alphanumeric and other keys, is coupled to bus 1502 for communicating information and command selections to processor 1504. Another type of user input device is cursor control 1516, such as a mouse, trackball, stylus, or cursor direction keys for communicating direction information and command selections to processor 1504 and for controlling cursor movement on display 1512. This input device typically has two degrees of freedom in two axes, a first axis (e.g., x) and a second axis (e.g., y), that allows the device to specify positions in a plane.

The invention is related to the use of computer system 1500 for data model prediction. According to one embodiment of the invention, data model prediction is provided by computer system 1500 in response to processor 1504 executing one or more sequences of one or more instructions contained in main memory 1506. Such instructions may be read into main memory 1506 from another computer-readable medium, such as storage device 1510. Execution of the sequences of instructions contained in main memory 1506 causes processor 1504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1504 for execution. Such a medium may take many forms, including but not limited to, non-volatile media, volatile media, and transmission media. Non-volatile media includes, for example, optical or magnetic disks, such as storage device 1510. Volatile media includes dynamic memory, such as main memory 1506. Transmission media includes coaxial cables, copper wire and fiber optics, including the wires that comprise bus 1502. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1504 for execution. For example, the instructions may initially be carried on a magnetic disk of a remote computer. The remote computer can load the instructions into its dynamic memory and send the instructions over a telephone line using a modem. A modem local to computer system 1500 can receive the data on the telephone line and use an infrared transmitter to convert the data to an infrared signal. An infrared detector can receive the data carried in the infrared signal and appropriate circuitry can place the data on bus 1502. Bus 1502 carries the data to main memory 1506, from which processor 1504 retrieves and executes the instructions. The instructions received by main memory 1506 may optionally be stored on storage device 1510 either before or after execution by processor 1504.

Computer system 1500 also includes a communication interface 1518 coupled to bus 1502. Communication interface 1518 provides a two-way data communication coupling to a network link 1520 that is connected to a local network 1522. For example, communication interface 1518 may be an integrated services digital network ("ISDN") card or a modem to provide a data communication connection to a corresponding type of telephone line. As another example, communication interface 1518 may be a local area network ("LAN") card to provide a data communication connection to a compatible LAN. Wireless links may also be implemented. In any such implementation, communication interface 1518 sends and receives electrical, electromagnetic or optical signals that carry digital data streams representing various types of information.

Network link 1520 typically provides data communication through one or more networks to other data devices. For example, network link 1520 may provide a connection through local network 1522 to a host computer 1524 or to data equipment operated by an Internet Service Provider ("ISP") 1526. ISP 1526 in turn provides data communication services through the world wide packet data communication network now commonly referred to as the "Internet" 1528. Local network 1522 and Internet 1528 both use electrical, electromagnetic or optical signals that carry digital data streams. The signals through the various networks and the signals on network link 1520 and through communication interface 1518, which carry the digital data to and from computer system 1500, are exemplary forms of carrier waves transporting the information.

Computer system 1500 can send messages and receive data, including program code, through the network(s), network link 1520 and communication interface 1518. In the Internet example, a server 1530 might transmit a requested code for an application program through Internet 1528, ISP 1526, local network 1522 and communication interface 1518. In accordance with the invention, one such downloaded application provides for data model prediction as described herein.

The received code may be executed by processor 1504 as it is received, and/or stored in storage device 1510, or other non-volatile storage for later execution. In this manner, computer system 1500 may obtain application code in the form of a carrier wave.

7.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method, comprising the machine-implemented steps of:
    receiving one or more command line interface commands associated with a network device that does not natively provide a programmable management interface;
    creating and storing a knowledge base comprising a representation of a syntax and semantics of the one or more command line interface commands;
    receiving from the knowledge base a data structure representing a particular configuration command among the one or more command line interface commands;
    creating and storing an intermediate data model that represents the configuration command, wherein creating the intermediate data model includes predicting one or more attributes of the configuration command;
    based on the intermediate data model, creating and storing a file defining an application programming interface for the network device;
    wherein the application programming interface is generated at least in part based upon a capability matrix containing information about capabilities of the network device;
    wherein the method is performed by one or more computing devices.

2. A method as recited in claim 1, wherein the predicting is performed at least in part based upon device capabilities that are derived from the capability matrix.

3. A method as recited in claim 1, wherein an application request is received at the application programming interface, and in response thereto, the intermediate data model is selectively transformed into a text representation of the particular configuration command or into a structured document representation of the particular configuration command.

4. A method as recited in claim 1, wherein the knowledge base is created and stored in an automatic command learning process based on receiving and interpreting a plurality of the commands as the commands are provided to the network device.

5. A method as recited in claim 1, wherein the predicting includes predicting one or more names of one or more parameters to the particular configuration command.

6. A method as recited in claim 5, wherein the predicting includes predicting whether a particular parameter is mandatory or optional to complete the particular command.

7. A method as recited in claim 5, wherein the predicting includes predicting data types of the parameters.

8. A method as recited in claim 5, wherein the predicting includes predicting a cardinality attribute of the particular configuration command.

9. A method as recited in claim 5, wherein the predicting includes predicting an order of the parameters.

10. A method as recited in claim 1, wherein the intermediate data model represents a command using one or more container objects and one or more properties objects.

11. A method as recited in claim 1, wherein the knowledge base is created based on receiving information from one or more command line interface (CLI) management information bases (MIBs) and one or more simple network management protocol (SNMP) MIBs supported on the device.

12. A method as recited in claim 1, wherein selectively transforming includes selectively transforming the intermediate data model into an extensible markup language (XML) representation of the particular configuration command.

13. A method as recited in claim 12, wherein the XML representation conforms to the NETCONF device configuration protocol (NETCONF protocol) and is transformed in response to receiving one or more NETCONF XML requests.

14. An apparatus for providing a programmable interface to a network device, comprising:
one or more processors;
means for receiving one or more command line interface commands associated with a network device that does not natively provide a programmable management interface;
means for creating and storing a knowledge base comprising a representation of a syntax and semantics of the one or more command line interface commands;
means for receiving from the knowledge base a data structure representing a particular configuration command among the one or more command line interface commands;
means for creating and storing an intermediate data model that represents the configuration command, wherein creating the intermediate data model includes predicting one or more attributes of the configuration command;
means for creating and storing a file defining an application programming interface for the network device, based on the intermediate data model;
means for generating an application programming interface, at least in part based upon a capability matrix containing information about capabilities of the network device.

15. An apparatus as recited in claim 14, wherein the knowledge base is created and stored in an automatic command learning process based on receiving and interpreting a plurality of the commands as the commands are provided to the network device.

16. An apparatus as recited in claim 14, wherein the predicting means includes means for predicting one or more names of one or more parameters to the particular configuration command.

17. An apparatus as recited in claim 16, wherein the predicting means includes means for predicting whether a particular parameter is mandatory or optional to complete the particular command.

18. An apparatus as recited in claim 16, wherein the predicting means includes means for predicting data types of the parameters.

19. An apparatus as recited in claim 16, wherein the predicting means includes means for predicting a cardinality attribute of the particular configuration command.

20. An apparatus as recited in claim 16, wherein the predicting means includes means for predicting an order of the parameters.

21. An apparatus as recited in claim 14, wherein selectively transforming includes selectively transforming the intermediate data model into an extensible markup language (XML) representation of the particular configuration command, wherein the XML representation conforms to the NETCONF device configuration protocol (NETCONF protocol) and is transformed in response to receiving one or more NETCONF XML requests.

22. An apparatus for creating providing a programmable interface to a network device, comprising:
a network interface that is coupled to the data network for receiving one or more packet flows therefrom;
a processor;
one or more stored sequences of instructions which, when executed by the processor, cause the processor to carry out the steps of:
receiving one or more command line interface commands associated with a network device that does not natively provide a programmable management interface;
creating and storing a knowledge base comprising a representation of a syntax and semantics of the one or more command line interface commands;
receiving from the knowledge base a data structure representing a particular configuration command among the one or more command line interface commands;
creating and storing an intermediate data model that represents the configuration command, wherein creating the intermediate data model includes predicting one or more attributes of the configuration command;
based on the intermediate data model, creating and storing a file defining an application programming interface for the network device;
wherein the application programming interface is generated at least in part based upon a capability matrix containing information about capabilities of the network device.

23. An apparatus as recited in claim 22, wherein the knowledge base is created and stored in an automatic command learning process based on receiving and interpreting a plurality of the commands as the commands are provided to the network device.

24. An apparatus as recited in claim 22, wherein the predicting includes predicting one or more names of one or more parameters to the particular configuration command.

25. An apparatus as recited in claim 24, wherein the predicting includes predicting whether a particular parameter is mandatory or optional to complete the particular command.

26. An apparatus as recited in claim 22, wherein the predicting includes predicting data types of the parameters.

27. An apparatus as recited in claim 22, wherein the predicting includes predicting a cardinality attribute of the particular configuration command.

28. An apparatus as recited in claim 22, wherein the predicting includes predicting an order of the parameters.

29. An apparatus as recited in claim 22, wherein selectively transforming includes selectively transforming the intermediate data model into an extensible markup language (XML) representation of the particular configuration command, wherein the XML representation conforms to the NETCONF device configuration protocol (NETCONF protocol) and is transformed in response to receiving one or more NETCONF XML requests.

30. A computer-readable volatile or non-volatile medium carrying one or more sequences of instructions for providing a programmable interface for a network device, which instructions, when executed by one or more processors, cause the one or more processors to carry out the steps of:
receiving one or more command line interface commands associated with a network device that does not natively provide a programmable management interface;
creating and storing a knowledge base comprising a representation of a syntax and semantics of the one or more command line interface commands;
receiving from the knowledge base a data structure representing a particular configuration command among the one or more command line interface commands;
creating and storing an intermediate data model that represents the configuration command, wherein creating the intermediate data model includes predicting one or more attributes of the configuration command;

based on the intermediate data model, creating and storing a file defining an application programming interface for the network device;

wherein the application programming interface is generated at least in part based upon a capability matrix containing information about capabilities of the network device.

31. A computer-readable volatile or non-volatile medium as recited in claim 30, wherein the predicting is performed at least in part based upon device capabilities that are derived from the capability matrix.

32. A computer-readable volatile or non-volatile medium as recited in claim 30, wherein the knowledge base is created and stored in an automatic command learning process based on receiving and interpreting a plurality of the commands as the commands are provided to the network device.

33. A computer-readable volatile or non-volatile medium as recited in claim 30, wherein the predicting includes predicting one or more names of one or more parameters to the particular configuration command.

* * * * *